United States Patent
Gasperecz et al.

(10) Patent No.: US 11,763,321 B2
(45) Date of Patent: *Sep. 19, 2023

(54) SYSTEMS AND METHODS FOR EXTRACTING REQUIREMENTS FROM REGULATORY CONTENT

(71) Applicant: MOORE AND GASPERECZ GLOBAL, INC., Vancouver (CA)

(72) Inventors: Greg J. Gasperecz, New Orleans, LA (US); Margery A. Moore, Vancouver (CA); Yaser Khalighi, Vancouver (CA); Gilda Majidi, Vancouver (CA); Amir Hossein Najian, Vancouver (CA)

(73) Assignee: MOORE AND GASPERECZ GLOBAL, INC., Vancouver (CA)

( * ) Notice: Subject to any disclaimer, the term of this patent is extended or adjusted under 35 U.S.C. 154(b) by 918 days.

This patent is subject to a terminal disclaimer.

(21) Appl. No.: 16/562,589

(22) Filed: Sep. 6, 2019

(65) Prior Publication Data

US 2020/0279271 A1 Sep. 3, 2020

Related U.S. Application Data

(60) Provisional application No. 62/728,142, filed on Sep. 7, 2018.

(51) Int. Cl.
*G06Q 30/00* (2023.01)
*G06N 20/00* (2019.01)
(Continued)

(52) U.S. Cl.
CPC .......... *G06Q 30/018* (2013.01); *G06N 3/008* (2013.01); *G06N 5/013* (2023.01); *G06N 5/04* (2013.01); *G06N 20/00* (2019.01)

(58) Field of Classification Search
None
See application file for complete search history.

(56) References Cited

U.S. PATENT DOCUMENTS 7,571,149 B1 8/2009 Yanosy, Jr.
7,778,954 B2 * 8/2010 Rhoads ................. G06F 16/951
715/713
(Continued)

FOREIGN PATENT DOCUMENTS

CA 2256408 C 12/1997
CA 2381460 A1 2/2001
(Continued)

OTHER PUBLICATIONS

International Search Report and Written Opinion issued by the Canadian Intellectual Property Office in connection with International Patent Application No. PCT/CA2021/051130 dated Nov. 1, 2021, 10 pages.

(Continued)

*Primary Examiner* — Eric W Stamber
*Assistant Examiner* — Ashley Y Young

(57) ABSTRACT

Described herein are systems and methods for extracting requirements from regulatory content data. The method including: receiving the regulatory content data; classifying an associated type for each citation in the regulatory content data using a trained classifier machine learning model, the classifier machine learning model trained using regulatory content data including expert labelled annotations; splitting citations in the regulatory content data, including determining whether each citation includes more than one requirement; merging one or more citations in the regulatory content data, including identifying child-parent relationships for the citations and merging citations based on conjunctive language; and outputting the citations and their associated type. In a particular case, the types of citations for classifi- (Continued)

cation include one of a requirement (REQ), an optional or site-specific requirement (OSR), a description (DSC), and part of another requirement.

20 Claims, 22 Drawing Sheets

(51) Int. Cl.
*G06N 5/04* (2023.01)
*G06Q 30/018* (2023.01)
*G06N 3/008* (2023.01)
*G06N 5/01* (2023.01)

(56) References Cited

U.S. PATENT DOCUMENTS

| | | | |
|---|---|---|---|
| 7,823,120 | B2 | 10/2010 | Kazakov et al. |
| 8,156,010 | B2 | 4/2012 | Gopalakrishnan |
| 8,266,184 | B2 | 9/2012 | Liu et al. |
| 8,306,819 | B2 | 11/2012 | Liu et al. |
| 8,447,788 | B2 | 5/2013 | Liu et al. |
| 8,510,345 | B2 | 8/2013 | Liu et al. |
| 8,676,733 | B2 | 3/2014 | Heisele et al. |
| 8,693,790 | B2 | 4/2014 | Jiang et al. |
| 8,897,563 | B1 | 11/2014 | Welling et al. |
| 10,013,655 | B1 | 7/2018 | Clark |
| 10,516,902 | B1 | 12/2019 | Manoria et al. |
| 10,565,502 | B2 | 2/2020 | Scholtes |
| 10,853,696 | B1 | 12/2020 | Luo et al. |
| 11,005,888 | B2 | 5/2021 | Wang et al. |
| 11,080,486 | B2 | 8/2021 | Hao et al. |
| 11,194,784 | B2 | 12/2021 | Brisimi et al. |
| 11,275,936 | B2 | 3/2022 | Neumann |
| 2002/0080196 | A1 | 6/2002 | Bornstein et al. |
| 2004/0039594 | A1 | 2/2004 | Narasimhan et al. |
| 2005/0160263 | A1 | 7/2005 | Naizhen et al. |
| 2005/0188072 | A1 | 8/2005 | Lee, IV et al. |
| 2005/0198098 | A1 | 9/2005 | Levin et al. |
| 2006/0088214 | A1 | 4/2006 | Handley et al. |
| 2006/0117012 | A1* | 6/2006 | Rizzolo .............. G06Q 10/06 707/999.009 |
| 2007/0092140 | A1 | 4/2007 | Handley |
| 2007/0226356 | A1 | 9/2007 | Levin et al. |
| 2008/0216169 | A1 | 9/2008 | Naizhen et al. |
| 2008/0263505 | A1 | 10/2008 | StClair et al. |
| 2010/0153473 | A1 | 6/2010 | Gopalan |
| 2010/0228548 | A1 | 9/2010 | Liu et al. |
| 2011/0258182 | A1 | 10/2011 | Singh et al. |
| 2011/0289550 | A1 | 11/2011 | Nakae |
| 2012/0011455 | A1 | 1/2012 | Subramanian et al. |
| 2013/0236110 | A1 | 9/2013 | Barrus |
| 2016/0042251 | A1 | 2/2016 | Cordova-Diba et al. |
| 2016/0063322 | A1 | 3/2016 | Déjean et al. |
| 2016/0350885 | A1* | 12/2016 | Clark .............. G06Q 30/0185 |
| 2017/0235848 | A1* | 8/2017 | Van Dusen .............. G06N 5/02 705/12 |
| 2017/0264643 | A1 | 9/2017 | Bhuiyan et al. |
| 2018/0075554 | A1 | 3/2018 | Clark et al. |
| 2018/0137107 | A1 | 5/2018 | Buccapatnam Tirumala et al. |
| 2018/0197111 | A1 | 7/2018 | Crabtree et al. |
| 2018/0225471 | A1 | 8/2018 | Goyal et al. |
| 2019/0098054 | A1 | 3/2019 | Ramachandran et al. |
| 2019/0147388 | A1 | 5/2019 | Alexander |
| 2019/0251397 | A1 | 8/2019 | Tremblay et al. |
| 2019/0279111 | A1* | 9/2019 | Merrill .............. B60Q 9/00 |
| 2019/0377785 | A1 | 12/2019 | N et al. |
| 2020/0004877 | A1 | 1/2020 | Ghafourifar et al. |
| 2020/0019767 | A1 | 1/2020 | Porter et al. |
| 2020/0050620 | A1 | 2/2020 | Clark et al. |
| 2020/0074515 | A1 | 3/2020 | Ghatage et al. |
| 2020/0082204 | A1 | 3/2020 | Beaver |
| 2020/0111023 | A1 | 4/2020 | Pondicherry Murugappan et al. |
| 2020/0125659 | A1 | 4/2020 | Brisimi et al. |
| 2020/0213365 | A1 | 7/2020 | Ramachandran et al. |
| 2020/0233862 | A1 | 7/2020 | Shaked et al. |
| 2020/0311201 | A1 | 10/2020 | Sainani et al. |
| 2020/0320349 | A1 | 10/2020 | Yu et al. |
| 2020/0349920 | A1 | 11/2020 | Al Bawab et al. |
| 2021/0089767 | A1 | 3/2021 | Ashek et al. |
| 2021/0117621 | A1 | 4/2021 | Sharpe et al. |
| 2021/0124800 | A1 | 4/2021 | Williams |
| 2021/0209358 | A1 | 8/2021 | Hao et al. |

FOREIGN PATENT DOCUMENTS

| | | | |
|---|---|---|---|
| CA | 2410881 | A1 | 12/2001 |
| CA | 2419377 | A1 | 2/2002 |
| CA | 2699397 | A1 | 4/2009 |
| CA | 2699644 | A1 | 4/2009 |
| CN | 110705223 | A | 1/2020 |
| EP | 2993617 | A1 | 3/2016 |
| RU | 2628431 | C1 | 8/2017 |

OTHER PUBLICATIONS

International Search Report and Written Opinion issued by the Canadian Intellectual Property Office in connection with International Patent Application No. PCT/CA2021/051586 dated Jan. 25, 2022, 10 pages.

International Search Report and Written Opinion issued by the Canadian Intellectual Property Office in connection with International Patent Application No. PCT/CA2021/051585 dated Feb. 16, 2022, 7 pages.

Zhong, Haoxi, et al; "How Does NLP Benefit Legal System: A summary of Legal Artificial Intelligence." arXiv preprint arXiv: 2004.12158v5, 2020, pp. 1-13.

Bach, Ngo Xuan, et al.; "Reference Extraction from Vietnamese Legal Documents", Proceedings of the Tenth International Symposium on Information and Communication Technology, 2019, pp. 486-493.

Chalkidis, Ilias et al.; "Extracting Contract Elements", Proceedings of the 16th edition of the International Conference an Artificial Intelligence and Law, 2017, pp. 1-10.

Chalkidis, Ilias et al.; "Obligation and Prohibition Extraction Using Hierarchical RNNs", arXiv preprint arXiv:1805.03871v1, 2018, pp. 1-6.

Elwany, E. et al.; "BERT Goes to Law School: Quantifying the Competitive Advantage of Access to Large Legal Corpora in Contract Understanding", arXiv: Computation and Language, 2019, pp. 1-4.

Nguyen, T. et al.; "Recurrent neural network-based models for recognizing requisite and effectuation parts in legal texts", Springer Science+Business Media B.V., 2018, pp. 169-199.

Chalkidis, I. et al.; "Deep learning in law: early adaptation and legal word embeddings trained on large corpora", Springer Nature B.V. 2018, pp. 171-198.

Tang, G. et al.; "Matching law cases and reference law provision with a neural attention model", 2016, pp. 1-4.

Kingston, J.; "Using artificial intelligence to support compliance with the general data protection regulation", Springer Science+ Business Media B.V., 2017 pp. 429-443.

Fatema et al.; "A Semi-Automated Methodology for Extracting Access Control Rules from the European Data Protection Directive", IEE Computer Society, 2016, pp. 25-32.

Mandal, S. et al.; "Modular Norm Models: A Lightweight Approach for Modeling and Reasoning about Legal Compliance", IEE Computer Society, 2017, pp. 657-662.

Hashmi M.; "A Methodology for Extracting Legal Norms from Regulatory Documents", IEEE Computer Society, 2015, pp. 41-50.

Kiyavitskaya, N. et al.; "Automating the Extraction of Rights and Obligations for Regulatory Compliance", Conceptual Modeling, 2008, pp. 154-168.

Islam, M. et al. "RuleRS: a rule-based architecture for decision support systems", Spring Science+Business Media B.V., 2018, pp. 315-344.

(56) References Cited

OTHER PUBLICATIONS

Yang X. et al., "Learning to Extract Semantic Structure from Documents Using Multimodal Fully Convolutional Neural Networks," The Pennsylvania State University, pp. 1-16, 2017.
Katti A. et al.; "Chargrid: Towards Understanding 2D Documents," arXiv: Computation and Language, 2018, pp. 1-11.
Soviany P. et al., "Optimizing the Trade-off between Single-Stage and Two-Stage Object Detectors using Image Difficulty Prediction," arXiv: Computer Vision and Pattern Recognition, pp. 2-6, 2018.
Tsai H. et al., "Small and Practical BERT Models for Sequence Labeling," pp. 9-11, 2019.
Denk, Timo I. et al., "BERTgrid: Contextualized Embedding for 2D Document Representation and Understanding", 33rd Conference on Neural Information Systems (NeurIPS 2019), Vancouver, Canada, pp. 2-4.
Locke, Daniel et al., Automatic cited decision retrieval: Working notes of Ielab for FIRE Legal Track Precedence Retrieval Task, Queensland University of Technology, 2017, pp. 1-2.
Locke, Daniel et al., Towards Automatically Classifying Case Law Citation Treatment Using Neural Networks. The University of Queensland, Dec. 2019, pp. 1-8.
Sadeghian, Ali et al., "Automatic Semantic Edge Labeling Over Legal Citation Graphs", Springer Science+Business Media B.V., Mar. 1, 2018, pp. 128-144.
Young T. et al., "Recent Trends in Deep Learning Based Natural Language Processing [Review Article]," IEEE Computational Intelligence Magazine, vol. 13, No. 3, pp. 1-32, 2018.
Radford A. et al., "Improving Language Understanding by Generative Pre-Training", pp. 1-12, 2018.
Devlin, J. et al. "BERT: Pre-training of Deep Bidirectional Transformers for Language Understanding", arXiv: Computation and Language, pp. 1-17, 2018.
Lan, Z. et al., "ALBERT: A Lite BERT for Self-Supervised Learning of Language Representations", arXiv: Computation and Language, pp. 1-17, 2019.
Liu, Y. et al., "RoBERTa: A Robustly Optimized BERT Pretraining Approach", arXiv: Computation and Language, pp. 2-13, 2019.
Sanh, V. et al., "DistilBERT, a Distilled Version of BERT: smaller, faster, cheaper and lighter", arXiv: Computation and Language, pp. 1-5, 2019.
Lee, J. et al., "BioBERT: a pre-trained biomedical language representation model for biomedical text mining", Bioinformatics, pp. 1-7, 2019.
Peters, M. E. et al., "To Tune or Not to Tune? Adapting Pretrained Representations to Diverse Tasks", arXiv: Computation and Language, pp. 1-8, 2019.
Siblini, C. et al., "Multilingual Question Answering from Formatted Text applied to Conversational Agents", arXiv: Computation and Language, pp. 1-10, 2019.
Lai, A. et al., "Natural Language Inference from Multiple Premises", arXiv: Computation and Language, pp. 1-10, 2017.
Yin, Pengcheng et al.; "TaBERT: Pretraining for Joint Understanding of Textual and Tabular Data", arXiv: 2005.08314v1 [cs.CL] May 17, 2020.
Deng, Xiang et al.; "TURL: Table Understanding through Representation Learning", arXiv:2006.14806v2 [cs.IR] Dec. 3, 2020.
Du, Lun et al.; "TabularNet: A Neural Network Architecture for Understanding Semantic Structures of Tabular Data", arXiv:2106.03096v2 [cs.LG] Jun. 16, 2021.

Herzig, Jonathan et al.; "TAPAS: Weakly Supervised Table Parsing via Pre-training", arXiv:2004.02349v2 [cs.IR] Apr. 21, 2020.
Yang, Jingfeng et al.; "TABLEFORMER: Robust Transformer Modeling for Table-Text Encoding", arXiv:2203.00274v1 [cs.CL] Mar. 1, 2022.
Herzig, Jonathan et al.; "Open Domain Question Answering over Tables via Dense Retrieval", arXiv:2103.12011v2 [cs.CL] Jun. 9, 2021.
Majumder, Bodhisattwa Prasad et al.; "Representation Learning for Information Extraction from Form-like Documents", Proceedings of the 58th Annual Meeting of the Association for Computational Linguistics, pp. 6495-6504, Jul. 5-10, 2020.
Eisenschlos, Julian Martin et al.; "Understanding tables with intermediate pre-training", arXiv:2010.00571v2 [cs.CL] Oct. 5, 2020.
Erickson, Nick et al.; "AutoGluon-Tabular: Robust and Accurate AutoML for Structured Data", arXiv:2003.06505v1 [stat.ML] Mar. 13, 2020.
Logan IV, Robert L. et al.; "Multimodal Attribute Extraction", arXiv:1711.11118v1 [cs.CL] Nov. 29, 2017.
Rebuffel, Clément et al., "A Hierarchical Model for Data-to-Text Generation", arXiv:1912.10011v1 [cs.CL] Dec. 20, 2019.
Ma, Shuming et al.; "Key Fact as Pivot: A Two-Stage Model for Low Resource Table-to-Text Generation", arXiv:1908.03067v1 [cs.CL] Aug. 8, 2019.
Zhang, Ziqi; "Towards Efficient and Effective Semantic Table Interpretation", P. Mika et al. (Eds.) ISWC 2014, Part I, LNCS 8796, pp. 487-505, 2014, Springer International Publishing Switzerland.
Bhagavatula, Chandra Sekhar et al.; "TabEL: Entity Linking in Web Tables", Northwestern University Evanston IL 60201, USA.
Zhang, Shuo et al.; "Web Table Extraction, Retrieval and Augmentation: A Survey", arXiv:2002.00207v2 [cs.IR] Feb. 5, 2020.
Ritze, Dominique et al.; Matching HTML Tables to Dbpedia; Wims 2015 Limassol, Cyprus.
Efthymiou, Vasilis et al.; "Matching Web Tables with Knowledge Base Entities: From Entity Lookups to Entity Embeddings", pp. 1-16.
Jiménez-Ruiz, Ernesto et al.; "SemTab 2019: Resources to Benchmark Tabular Data to Knowledge Graph Matching Systems", A Harth et al. (Eds.): ESWC 2020, LNCS 12123, pp. 514-530, 2020, Springer Nature Switzerland AG.
Zhang, Ziqi; "Effective and Efficient Semantic Table Interpretation using TableMiner", Semantic Web tbd (2016) pp. 1-39, IOS Press.
Chen, Shuang et al.; "LinkingPark: An Integrated Approach for Semantic Table Interpretation", CEUR-WS.org/Vol-2775/paper7, pp. 1-10.
Shigarov A. et al.; "TabbyXL: Software platform for rule-based spreadsheet data extraction and transformation", Elsevier, Software X 10 (2019) 100270, pp. 1-6.
Shigarov A. et al.; "Rule-based spreadsheet data transformation from arbitrary to relational tables", Elsevier, Informational Systems 71 (2017) pp. 123-136.
Xu, Yiheng et al.; "LayoutLM: Pre-training of Text and Layout for Document Image Understanding", arXiv:1912.13318v5 [cs.CL] Jun. 16, 2020.
Dorodnykh, Nikita O. et al.; "Towards A Unviersal Approach for Semantic Interpretation of Spreadsheets Data", IDEAS 2020, Aug. 12-14, 2020, Seoul, Republic of Korea.
Non-Final Office Action issued by the U.S. Patent and Trademark Office dated Nov. 16, 2022 in connection with U.S. Appl. No. 17/898,788 11 pages.

* cited by examiner

| | | | |
|---|---|---|---|
| §60.112b | Standard for volatile organic compounds (VOC). | DSC | |
| | The owner or operator of each storage vessel either with a design capacity greater than or equal to 151 m3 containing a VOL that, as stored, has a maximum true vapor pressure equal to or greater than 5.2 kPa but less than 76.6 kPa or with a design capacity greater than or equal to 75 m3 but less than 151 m3 containing a VOL that, as stored, has a maximum true vapor pressure equal to or greater than 27.6 kPa but less than 76.6 kPa, shall equip each storage vessel with one of the following: | | §60.112b(a) |
| §60.112b(a) | | REQ | |
| | The owner or operator of each storage vessel either with a design capacity greater than or equal to 151 m3 containing a VOL that, as stored, has a maximum true vapor pressure equal to or greater than 5.2 kPa but less than 76.6 kPa or with a design capacity greater than or equal to 75 m3 but less than 151 m3 containing a VOL that, as stored, has a maximum true vapor pressure equal to or greater than 27.6 kPa but less than 76.6 kPa, shall equip each storage vessel with one of the following: A fixed roof in combination with an internal floating roof meeting the following specifications: An external floating roof means a pontoon-type or double-deck type cover that rests on the liquid surface in a vessel with no fixed roof. Each external floating roof must meet the following specifications: A closed vent system and control device meeting the following specifications: A system equivalent to those described in paragraphs (a)(1), (a)(2), or (a)(3) of this section as provided in §60.114b of this subpart. | | §60. 112b(a), §60. 112b(a)(1), §60. 112b(a)(1)(i), §60. 112b(a)(1)(ii), §60. 112b(a)(1)(iv), §60. 112b(a)(1)(v), §60. 112b(a)(1)(vi), §60. 112b(a)(1)(vii), §60. 112b(a)(2), §60. 112b(a)(3), §60. 112b(a)(4) |
| §60.112b(a)(1) | A fixed roof in combination with an internal floating roof meeting the following specifications: | REQ | §60. 112b(a), §60. 112b(a)(1) |
| | The internal floating roof shall rest or float on the liquid surface (but not necessarily in complete contact with it) inside a storage vessel that has a fixed roof. The internal floating roof shall be floating on the liquid surface at all times, except during those intervals when the storage vessel is completely emptied and refilled. When the roof is resting on the leg supports, the process of filling, emptying, or refilling shall be continuous and shall be accomplished as rapidly as possible. | | |
| §60.112b(a)(1)(i) | The internal floating roof shall rest or float on the liquid surface (but not necessarily in complete contact with it) inside a storage vessel that has a fixed roof. | REQ | §60. 112b(a), §60. 112b(a)(1), §60. 112b(a)(1)(i) |
| §60.112b(a)(1)(ii) | The internal floating roof shall be floating on the liquid surface at all times, except during those intervals when the storage vessel is completely emptied or subsequently emptied and refilled. The process of filling, emptying, or refilling shall be continuous and shall be accomplished as rapidly as possible. | REQ | §60. 112b(a), §60. 112b(a)(1), §60. 112b(a)(1)(ii) |
| §60.112b(a)(1)(iii) | Each internal floating roof shall be equipped with one of the following closure devices between the wall of the storage vessel and the edge of the internal floating roof: A foam- or liquid-filled seal mounted in contact with the liquid (liquid-mounted seal). A liquid-mounted seal means a foam- or liquid-filled seal mounted in contact with the liquid between the wall of the storage vessel and the floating roof continuously around the circumference of the tank. Two seals mounted one above the other so that each forms a continuous closure that completely covers the space between the wall of the storage vessel and the edge of the internal floating roof. The lower seal may be vapor-mounted, but both must be continuous. A mechanical shoe seal. A mechanical shoe seal is a metal sheet held vertically against the wall of the storage vessel by springs or weighted levers and is connected by braces to the floating roof. A flexible coated fabric (envelope) spans the annular space between the metal sheet and the floating roof. | REQ | §60. 112b(a), §60. 112b(a)(1), §60. 112b(a)(1)(iii)(A), §60. 112b(a)(1)(iii)(B), §60. 112b(a)(1)(iii)(C) |

| Citation | Topic | Level | Regulation | Comments |
|---|---|---|---|---|
| §60.112b(b) | | | The owner or operator of each storage vessel with a design capacity greater than or equal to 75 m3 which contains a VOL that, as stored, has a maximum true vapor pressure greater than or equal to 76.6 kPa shall equip each storage vessel with one of the following:A closed vent system and control device as specified in §60.112b(a)(3).A system equivalent to that described in paragraph (b)(1) as provided in §60.114b of this subpart. | §60.112b(b), §60.112b(b)(1), §60.112b(b)(2) |
| §60.112b(b)(1) | A closed vent system and control device as specified in §60.112b(a)(3). | REQ | | §60.112b(b), §60.112b(b)(1) |
| §60.112b(b)(2) | A system equivalent to that described in paragraph (b)(1) as provided in §60.114b of this subpart. | | | §60.112b(b), §60.112b(b)(2) |

FIG. 8

| Citation | Title | Status | Applicable Requirements/Exemptions |
|---|---|---|---|
| §60.112b(a)(3) | A closed vent system and control device meeting the following specifications: | | |
| §60.112b(a)(3)(i) | The closed vent system shall be designed to collect all VOC vapors and gases discharged from the storage vessel and operated with no detectable emissions as indicated by an instrument reading of less than 500 ppm above background and visual inspections, as determined in part 60, subpart VV, §60.485(b). | REQ | The closed vent system shall be designed to collect all VOC vapors and gases discharged from the storage vessel and operated with no detectable emissions as indicated by an instrument reading of less than 500 ppm above background and visual inspections, as determined in part 60, subpart VV, §60.485(b). | §60.112b(a), §60.112b(a)(3), §60.112b(a)(3)(i) |
| §60.112b(a)(3)(ii) | The control device shall be designed and operated to reduce inlet VOC emissions by 95 percent or greater. If a flare is used as the control device, it shall meet the specifications described in the general control device requirements (§60.18) of the General Provisions. | REQ | The control device shall be designed and operated to reduce inlet VOC emissions by 95 percent or greater. | §60.112b(a), §60.112b(a)(3), §60.112b(a)(3)(ii) |
| §60.112b(a)(3)(iii) | The control device shall be designed and operated to reduce inlet VOC emissions by 95 percent or greater. If a flare is used as the control device, it shall meet the specifications described in the general control device requirements (§60.18) of the General Provisions. | REQ | If a flare is used as the control device, it shall meet the specifications described in the general control device requirements (§60.18) of the General Provisions. | §60.112b(a), §60.112b(a)(3), §60.112b(a)(3)(iii) |

|  | | Predicted Label | | | | Total | Accuracy |
|---|---|---|---|---|---|---|---|
|  |  | REQ | OSR | DSC | Blank |  |  |
| True Label | REQ | 86 | 4 | 0 | 0 | 90 | 95.56% |
|  | OSR | 1 | 13 | 0 | 0 | 14 | 92.86% |
|  | DSC | 1 | 2 | 35 | 0 | 38 | 92.11% |
|  | Blank | 0 | 0 | 0 | 31 | 31 | 100.00% |
|  |  |  |  |  |  | 173 |  |

Overal Accuracy     95.38%

Accuracy for (OSR and REQ)     95.19%

FIG. 15

| Citation Number | Citation Text | Classification | Requirement Description |
|---|---|---|---|
| 60.5375(a)(1) | For each stage of the well completion operation, as defined in 60.5430, follow the requirements specified in paragraph (a)(1)(i) and (ii) of this section. | RAE | |
| 60.5375(a)(1)(i) | During the initial flowback stage, route the flowback into one or more well completion vessels or storage vessels and commence operation of a separator unless it is technically infeasible for a separator to function. Any gas present in the initial flowback stage is not subject to control under this section. | REQ | 60.5375(a)(1) For each stage of the well completion operation, as defined in 60.5430, follow the requirements specified in paragraph (a)(1)(i) and (ii) of this section. 60.5375(a)(1)(i) During the separation flowback stage, route all recovered liquids from the separator to one or more well completion vessels or storage vessels, re-inject the liquids into the well or another well or route the recovered liquids to a collection system. |
| 60.5375(a)(1)(ii) | During the separation flowback stage, route all recovered liquids from the separator to one or more well completion vessels or storage vessels, re-inject the liquids into the well or another well or route the recovered liquids to a collection system. | REQ | 60.5375(a)(1) For each stage of the well completion operation, as defined in 60.5430, follow the requirements specified in paragraph (a)(1)(i) and (ii) of this section. 60.5375(a)(1)(ii) During the separation flowback stage, route all recovered liquids from the separator to one or more well completion vessels or storage vessels, re-inject the liquids into the well or another well or route the recovered liquids to a collection system. |

FIG. 18

| Citation Number | Citation Text | Classification | Requirement Description | Requirement Name |
|---|---|---|---|---|
| 60.112b(a)(1)(i) | The internal floating roof shall rest or float on the liquid surface (but not necessarily in complete contact with it) inside a storage vessel that has a fixed roof. The internal floating roof shall be floating on the liquid surface at all times, except during initial fill and during those intervals when the storage vessel is completely emptied or subsequently emptied and refilled. When the roof is resting on the leg supports, the process of filling, emptying, or refilling shall be continuous and shall be accomplished as rapidly as possible. | REQ | The internal floating roof shall rest or float on the liquid surface (but not necessarily in complete contact with it) inside a storage vessel that has a fixed roof | 60.112b(a)(1)(i)_1 |
| 60.112b(a)(1)(i) | The internal floating roof shall rest or float on the liquid surface (but not necessarily in complete contact with it) inside a storage vessel that has a fixed roof. The internal floating roof shall be floating on the liquid surface at all times, except during initial fill and during those intervals when the storage vessel is completely emptied or subsequently emptied and refilled. When the roof is resting on the leg supports, the process of filling, emptying, or refilling shall be continuous and shall be accomplished as rapidly as possible. | REQ | The internal floating roof shall be floating on the liquid surface at all times, except during initial fill and during those intervals when the storage vessel is completely emptied and refilled | 60.112b(a)(1)(i)_2 |
| 60.112b(a)(1)(i) | The internal floating roof shall rest or float on the liquid surface (but not necessarily in complete contact with it) inside a storage vessel that has a fixed roof. The internal floating roof shall be floating on the liquid surface at all times, except during initial fill and during those intervals when the storage vessel is completely emptied or subsequently emptied and refilled. When the roof is resting on the leg supports, the process of filling, emptying, or refilling shall be continuous and shall be accomplished as rapidly as possible. | REQ | When the roof is resting on the leg supports, the process of filling, emptying, or refilling shall be continuous and shall be accomplished as rapidly as possible | 60.112b(a)(1)(i)_3 |

SYSTEMS AND METHODS FOR EXTRACTING REQUIREMENTS FROM REGULATORY CONTENT

TECHNICAL FIELD

The following relates generally to processing and parsing; and is more specifically directed to systems and methods of extracting requirements from regulatory content.

BACKGROUND

The United States of America, and most nations worldwide, have implemented a system of federal and/or state/provincial regulations, permits, plans, court ordered decrees, and/or regional or local rules (hereinafter collectively "regulatory content") to limit or reduce activities that are deemed not in the public's interest. Regulatory content may also include internal company guidance and/or standard operating procedures. Due to the increasing complexity and dangers inherent in industrial and commercial processes, this regulatory content has proliferated exponentially in an attempt by regulatory agencies and other governmental bodies to mitigate potential and actual dangers to the public. In short, the number of rules, regulations and other restrictions has increased at record rates, as has the overall volume of the text of the regulatory content.

As a general anecdotal estimation, there are about six million individual citations for all environmental, health, and safety regulations from all federal and state regulatory codes in the U.S.A. This estimate does not include the various safety boards, permit related requirements or court ordered directives. At such a volume, companies are highly challenged to be even be aware of, let alone comply with, such a vast body of regulatory requirements.

SUMMARY

In an aspect of the invention, there is provided a computer-implemented method for extracting requirements from regulatory content data, the regulatory content data comprising regulatory text, the regulatory text comprising citations, the method comprising: receiving the regulatory content data; classifying an associated type for each citation in the regulatory content data using a trained classifier machine learning model, the classifier machine learning model trained using regulatory content data comprising expert labelled annotations; splitting citations in the regulatory content data, comprising determining whether each citation comprises more than one requirement; merging one or more citations in the regulatory content data, comprising identifying child-parent relationships for the citations and merging citations based on conjunctive language; and outputting the citations and their associated type.

In a particular case of the method, the types of citations for classification comprise one of a requirement (REQ), an optional or site-specific requirement (OSR), a description (DSC), and part of another requirement.

In another case of the method, the method further comprising parsing the regulatory content data, comprising generating a tree structure with citations as nodes and citation numbers associated with the citations representing branch relationships of the tree structure.

In yet another case of the method, merging the one or more citations comprises identifying conjunction type as one of an AND conjunction, an OR conjunction, or a no conjunction.

In yet another case of the method, the AND conjunction indicates every direct child citation represents at least one requirement to be merged with the parent citation, the OR conjunction indicates all of the children are merged to form a single requirement with the parent citation, and the no conjunction indicates there is no merger.

In yet another case of the method, the merging of the one or more citations uses a natural language processing machine learning model trained using regulatory content data comprising expert labelled annotations for conjunction types.

In yet another case of the method, merging the citations based on conjunctive language comprises identifying the conjunction type on a per-sentence basis.

In yet another case of the method, splitting citations in the regulatory content data further comprises where said citation has been classified as REQ or OSR, breaking each citation into sentences, applying the classifier machine learning model to each of the sentences to identify an associated type for each sentence of the citation, and where there are more than one REQ or OSR type sentence for a given citation, splitting said sentences.

In yet another case of the method, the classifier machine learning model comprises a gradient boosting classifier.

In yet another case of the method, splitting the citations in the regulatory content data is prior to merging the one or more citations in the regulatory content data.

In another aspect, there is provided a system for extracting requirements from regulatory content data, the regulatory content data comprising regulatory text, the regulatory text comprising citations, the system comprising one or more processors and a data storage, the data storage comprising instructions for the one or more processors to execute: an input module to receive the regulatory content data; a classifier module to classify an associated type for each citation in the regulatory content data using a trained classifier machine learning model, the classifier machine learning model trained using regulatory content data comprising expert labelled annotations; a splitter module to split citations in the regulatory content data, comprising determining whether each citation comprises more than one requirement; and a merger module to merge one or more citations in the regulatory content data, comprising identifying child-parent relationships for the citations and merging citations based on conjunctive language, wherein the splitter module outputs the citations and their associated type.

In a particular case of the system, the types of citations for classification comprise one of a requirement (REQ), an optional or site-specific requirement (OSR), a description (DSC), and part of another requirement.

In another case of the system, the system is further comprised of a parser module to parse the regulatory content data, comprising generating a tree structure with citations as nodes and citation numbers associated with the citations representing branch relationships of the tree structure.

In yet another case of the system, merging the one or more citations comprises identifying conjunction type as one of an AND conjunction, an OR conjunction, or a no conjunction.

In yet another case of the system, the AND conjunction indicates every direct child citation represents at least one requirement to be merged with the parent citation, the OR conjunction indicates all of the children are merged to form a single requirement with the parent citation, and the no conjunction indicates there is no merger.

In yet another case of the system, the merging of the one or more citations uses a natural language processing machine learning model trained using regulatory content data comprising expert labelled annotations for conjunction types.

In yet another case of the system, merging the citations based on conjunctive language comprises identifying the conjunction type on a per-sentence basis.

In yet another case of the system, splitting citations in the regulatory content data further comprises where said citation has been classified as REQ or OSR, breaking each citation into sentences, applying the classifier machine learning model to each of the sentences to identify an associated type for each sentence of the citation, and where there are more than one REQ or OSR type sentence for a given citation, splitting said sentences.

In yet another case of the system, the classifier machine learning model comprises a gradient boosting classifier.

In yet another case of the system, splitting the citations in the regulatory content data is prior to merging the one or more citations in the regulatory content data.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

A greater understanding of the embodiments will be had with reference to the Figures, in which:

FIG. 3 shows an example of a desired output generated in accordance with the system of FIG. 1;

FIG. 5 shows an example of an input matrix, in accordance with the system of FIG. 1;

FIG. 8 shows an example of an output table for OR citations, in accordance with the system of FIG. 1;

FIG. 9 shows an example of an output table for AND citations, in accordance with the system of FIG. 1;

FIG. 13 shows an example of the citation of FIG. 12 after the split process, in accordance with the system of FIG. 1;

FIG. 15 shows a table of accuracy of predicted labels for an example using the system of FIG. 1;

FIG. 18 illustrates another example output of the system of FIG. 1;

FIG. 19 illustrates yet another example output of the system of FIG. 1;

FIG. 20 illustrates yet another example output of the system of FIG. 1 illustrating merging performed before splitting;

FIG. 21 illustrates yet another example output of the system of FIG. 1 illustrating splitting performed before merging.

DETAILED DESCRIPTION

Figure 1:
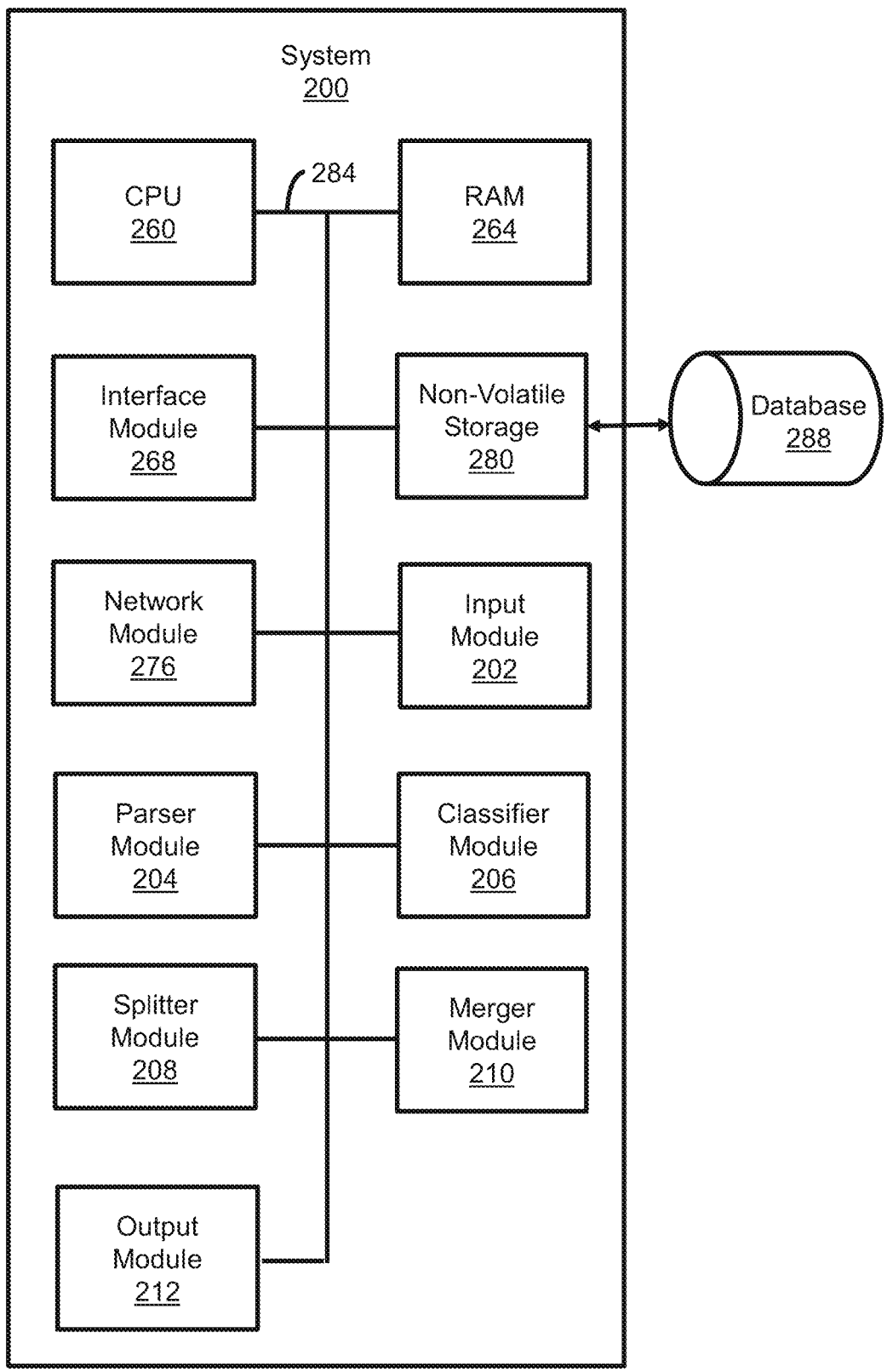
FIG. 1 shows of a system for extracting requirements from regulatory content, in accordance with an embodiment.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic discs, optical discs, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile discs (DVD) or other optical storage, magnetic cassettes, magnetic tape, magnetic disc storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to processing and parsing; and is more specifically directed to systems and methods of extracting requirements from regulatory content. The following allows the auto-extraction and itemization of unique, individual regulatory obligations and requirements from regulatory content. The extracted and itemized requirements can then be outputted or displayed for use; in some cases, each requirement being separately listed, and may include other useful features that facilitate the execution and tracking of compliance.

Extracting requirements from regulatory content is a significant technical challenge. Not all of the text of regulatory content necessarily includes one or more requirements. Some content is explanatory, definitional, contextual, or addresses the obligations of the governmental body which has issued it. A significant technical challenge, then, is to extract the exact actual requirements incurred by the regulated company or individual (regulated entity) that are contained in the regulatory content, and to identify which are mandatory and which are optional.

Some approaches use highly trained staff to read the regulatory content and provide a high-level description of the requirements contained in them. However, these high-level descriptions do not include the specific, individual requirements that are incurred by a specific company subject to the regulations. As such, while the publishing output may be useful in helping a company or individual understand the general regulatory framework of a text, it does not provide a specific, detailed list of action items and standards that the company or individual must address in order to comply with the text.

Advantageously, the present embodiments address the substantial technical challenge of extracting specific requirements from a vast body of regulatory content, and presents them in a form that allows systematic compliance with a set of definite action items.

Embodiments of the present disclosure provide a method of automatically reviewing selected regulatory content and extracting individual requirements contained therein to provide, for example, a structured and indexed list of obligations that a regulated entity can use to comply with regulatory content. In some cases, the current approaches can analyze and interpret an individual permit, regulation, rule, order, or other regulatory document, at a time.

In an example, the present approaches can analyze and interpret regulatory content by segregating each discrete section and subsection of the regulatory document into unique rows in a matrix or table with six columns. In this example, the six columns can be:

Citation;
Citation Text or Condition Text ("Citations" for regulations, "Conditions" for permits, plans, court orders, and other regulatory documents)
Regulatory Classification Label;
Requirement Description;
Requirement Name; and,
Referable Citations or Referable Conditions ("Citations" for regulations, "Conditions" for permits, plans, court orders, and other regulatory documents).

The citation column can be a regulatory citation number, permit condition number, or other hierarchical identifier from the regulatory document; with each row in the table having an associated citation.

The citation text or condition text column can be wording of a discrete section or subsection of the regulatory document. In some cases, this column is named "citation text" for all processed documents except permits. In some cases, this column is named "condition text" when the document being processed is a permit. In some cases, when placed in the output table in separate rows, these sections or subsections can be called the "row text". Generally, each row in the table has citation or condition text.

The regulatory classification label column can be a regulatory interpretation of each section or subsection of the regulatory document as determined by the system. Generally, each row in the table has a regulatory classification label.

The requirement description column can be a statement of what is required for row text that is classified as a Requirement. In some cases, only those rows that are classified as a requirement or an optional or site-specific requirement will have an entry in the requirement description column.

The requirement name column can be a unique value assigned to the row that identifies the row by including the citation; and in some cases, other letters or numbers. In some cases, only those rows that are classified as a requirement or an optional or site-specific requirement will have an entry in the requirement name column.

The referable citations or referable conditions column can be the citations/conditions that constitute the lineage (child, parent, grandparent, great grandparent, or the like) of a row. In some cases, referable citations can be generated for rows that are classified as requirement, optional or site-specific requirement, or a requirement addressed elsewhere.

A single regulatory document can vary in size, from one page to several hundred pages. Regulatory content generally consists of discrete sections and subsections. This content generally has an organizational hierarchy that is used to identify each discrete section or subsection of the document. For example, the United States Code of Federal Regulations (C.F.R.) is organized according to Title, Part, and Subpart. Each regulation is typically a unique subpart. Within each subpart the organizational hierarchy consists of a series of alphanumeric characters that relate to each level of the hierarchy within the regulation. A discrete section or subsection of the regulation is identified by an assembly of the levels of the hierarchy. This assembly of the levels of the hierarchy is the citation. For example, 40CFR60.112(a)(1) designates a unique set regulatory text within Title 40, Part 60, Section 112, subsection (a), sub-subsection (1). The present embodiments can analyze the organizational hierarchy of each document and uses the resulting tree structure to identify each discrete section or subsection within the document.

A section of regulatory content may have multiple subsections, each of which, in turn, may have their own subsections. In the present disclosure, when a section of a regulatory document has at least one subsection it is defined as a "Parent" and the subsection(s) is/are defined as "Child"/ "Children". For example, the citation column can define the parent child relationships for the text contained in each row of the output. In an example, the regulatory text cited at 40CFR60.5375(a)(1)(i) is a child of 40CFR60.5375(a)(1), which in turn is a child of 40CFR60.5375(a), and so on. Thus, a section of a regulatory document may be both a Parent and a Child, as is the case for 40CFR60.5375(a)(1). Following the Parent/Child pattern, two subsections of a section are considered "Siblings".

Embodiments of the present disclosure can identify and utilize the Parent/Child/Sibling relationships to the correctly interpret the regulatory content. In some cases, regulatory content frequently conveys single, unique requirements by describing them within a section and multiple subsections of the content. For example, consider the regulatory text at 40CFR60.5375(a)(1), as shown below:

(1) For each stage of the well completion operation, as defined in § 60.5430, follow the requirements specified in paragraph (a)(1)(i) and (ii) of this section.
(i) During the initial flowback stage, route the flowback into one or more well completion vessels or storage vessels and commence operation of a separator unless it is technically infeasible for a separator to function. Any gas present in the initial flowback stage is not subject to control under this section.
(ii) During the separation flowback stage, route all recovered liquids from the separator to one or more well completion vessels or storage vessels, re-inject the liquids into the well or another well or route the recovered liquids to a collection system.

In the above example, the three discrete text components (a section and two subsections) result in two requirements. This is because the parent section (1) conveys a definition of well completion operations that must be met for the two child sections (i) and (ii) to become requirements. Since the wording of the parent and each of the children combine to form the two separate requirements, a description of each of the two requirements would necessarily include the text of the parent with that of each child. Accordingly, in an example, embodiments of the present disclosure can output the table shown in FIG. 18.

The present embodiments can merge the correct requirement definitions because it can perform parsing that not only extracts each discrete section or subsection of text, but also build a tree of citations associated with each section or subsection that contains the Parent/Child relationships within the regulatory document. The tree of citations also allows the correct identification of the full citation of each section or subsection, as exemplified in the first column of FIG. 18. This type of data extraction and analysis (tree building) is extraordinarily technically difficult and has generally not been performed by other approaches.

In an embodiment of the present disclosure, a classification label can be applied that identifies each row text as one of the following:
A requirement, with the label being "REQ";
An optional or site-specific requirement, with the label being "OSR";
A requirement that is addressed elsewhere, with the label being "RAE"; or
Descriptive language for the purposes of the text, with the label being "DSC".

In this embodiment, each row text can be examined and assigned the REQ label for row text that incurs a compliance requirement on the regulated entity. The OSR label can be assigned to row text that is presented as an alternative or optional means of complying with an REQ or is intended for a specific individual company or location in a regulation. The DSC label can be assigned to row text that does not fully or partly incur a requirement on the regulated entity. The RAE classification can be used for row text that is part of one or more requirements, but which is not identified as a requirement so as not to over-count the actual number of unique requirements. In some cases, the RAE classification can be used in one of two circumstances:

When a row text requires the regulated entity to comply with one of its specified subsections (children) of that row text; and When a row text requires the regulated entity to comply with more than one of its specified subsections (children) of that row text.

In the first circumstance, the parent row can be classified as the REQ and the related children rows can be classified as RAEs. This is because, in the first case, there is only a single requirement stemming from the combination of row texts. In the second circumstance, each of the children rows can be classified as REQ and the Parent row can be classified as RAE. This is because each of the children row texts results in a requirement (in combination with the parent). In both circumstances, the requirement description can be derived by combining the citation and row text of the parent with those of the specified children. In the first circumstance, the values in the citation column and the citation text or condition text column for the parent and all specified children rows can be combined to form the single requirement description. In the second circumstance, the values in the citation column and the citation text or condition text column of the parent can be combined with the values of those columns in each of the specified children rows to create the requirement descriptions in each of the children rows. This function of combining the identifiers and text of multiple rows (triggered by the parent text) is called merging, as described herein.

In embodiments of the present disclosure, row text that contains more than one requirement can be split into separate rows for each requirement within the text. If a row is split into multiple requirements, each of these rows can contain the original permit condition number or regulatory citation and the row text. In some cases, each split row can be classified as an REQ, OSR or RAE, thus each split row can have the commensurate content for the other columns.

Merging, as described herein, can advantageously allow combination of the citation text across rows which have Parent/Child relationships into single requirements. This merging can produce a correct Requirement Description and ensure that rows that participate in a Requirement, but are not in themselves a Requirement, can be classified as RAE (Requirement Addressed Elsewhere). Thus, merging can ensure that the correct count of Requirements is contained in the processed output.

In addition to merging, splitting, as described herein, can ensure that the correct Requirement Description is contained in the processed output and ensure that the correct number of requirements is extracted into the processed output.

FIG. 1 illustrates a schematic diagram of a system 200 for extracting requirements from regulatory content, according to an embodiment. As shown, the system 200 has a number of physical and logical components, including a central processing unit ("CPU") 260, random access memory ("RAM") 264, an interface module 268, a network module 276, non-volatile storage 280, and a local bus 284 enabling CPU 260 to communicate with the other components. CPU 260 can include one or more processors. RAM 264 provides relatively responsive volatile storage to CPU 260. In some cases, the system 200 can be in communication with a device, for example a wearable device such as a smartwatch, via, for example, the interface module 268. The interface module 268 enables input to be provided; for example, directly via a user input device, or indirectly, for example via a separate computing Splitter device. The interface module 268 also enables output to be provided; for example, directly via a user display. The network module 276 permits communication with other systems or computing devices; for example, over a local area network or over the Internet. Non-volatile storage 280 can store an operating system and programs, including computer-executable instructions for implementing the methods described herein, as well as any derivative or related data. In some cases, this data can be stored in a database 288. During operation of the system 200, the operating system, the programs and the data may be retrieved from the non-volatile storage 280 and placed in RAM 264 to facilitate execution. In other embodiments, any operating system, programs, or instructions can be executed in hardware, specialized microprocessors, logic arrays, or the like.

In an embodiment, the CPU 260 can be configured to execute an input module 202, a parser module 204, a classifier module 206, a splitter module 208, a merger module 210, and an output module 212. In some cases, the interface module 268 and/or the network module 276 can be also executed on the CPU 260. In further cases, functions of the above modules can be combined or executed on other modules. In some cases, functions of the above modules can be executed on remote computing devices, such as centralized servers and cloud computing resources communicating over the network module 276.

Figure 2:
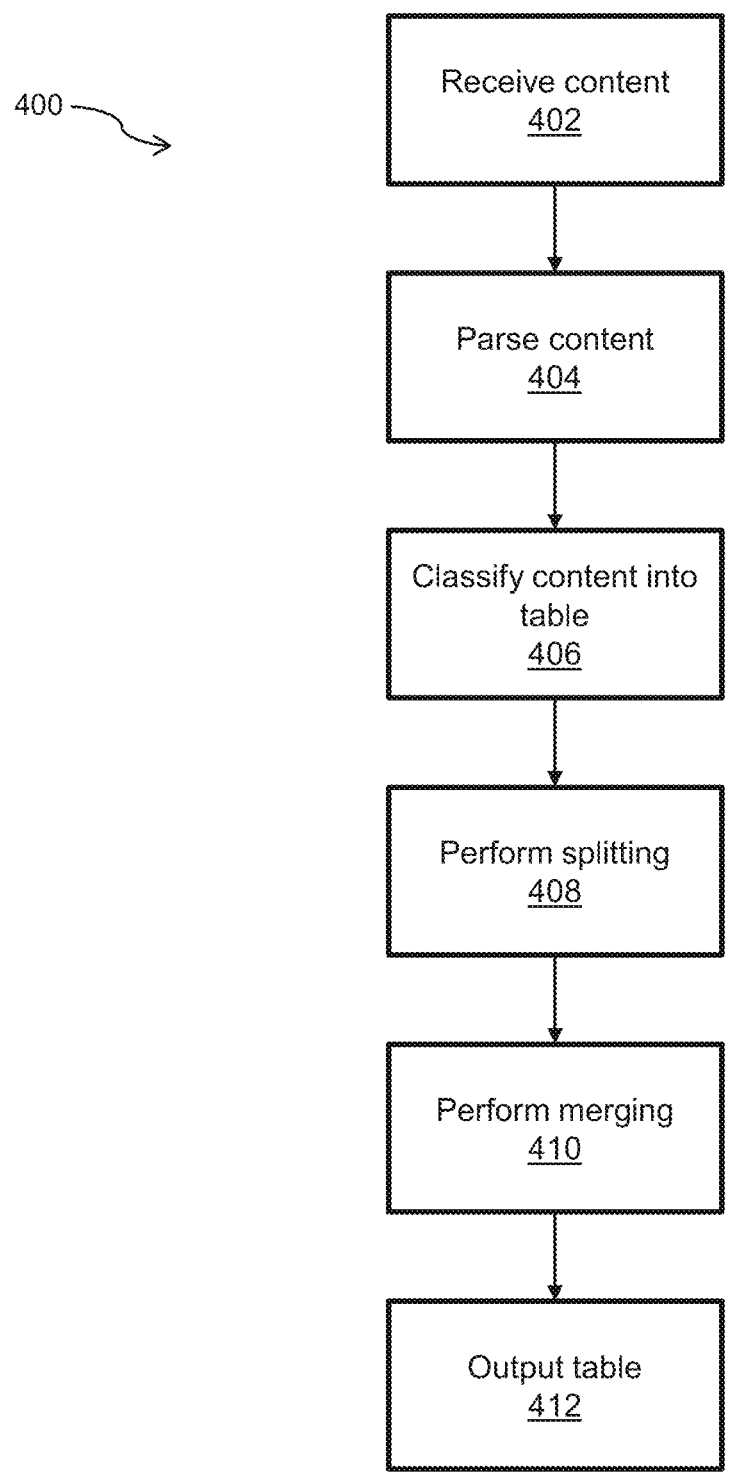
FIG. 2 shows a flowchart for extracting requirements from regulatory content, in accordance with an embodiment.

FIG. 2 illustrates a flowchart for a method 400 for extracting requirements from regulatory content, according to an embodiment. The method 400 can be used for parsing a large volume regulatory content. At block 402, the regulatory content text is inputted into the input module 202 either from the database 288 or received by the network module 276.

At block 404, the parser module 204 can perform parsing on the regulatory text. The parsing can include removing non-relevant information and text editor marks from the regulatory content text. The parsing can also include converting the text into a model that is a table or matrix. The table or matrix can, for example, have every subsection in a separate row in the table and every row containing a subsection identifier column; a text column; a label column; a requirement description column, and a related subsection column.

At block 406, the classifier module 206 can use a trained machine learning model to predict whether citation texts, including whole paragraphs or individual sentences, are indicative of a requirement (REQ), an optional or site-specific requirement (OSR), a description (DSC), or is part of another requirement. The trained machine learning model can be trained with a training set of regulatory content, and the model can be tuned as needed to increase an accuracy of the model.

For each subsection, the classifier module 206 can perform actions and/or analysis that follow for parsing the regulatory content text. The classifier module 206 can extract a subsection identifier into the subsection identifier column. The classifier module 206 can extract the text into the text column. The classifier module 206 can extract references in the text file to the subsection being processed, and place those references in the related subsection column.

The classifier module 206 can determine if the text constitutes one of:
i) one or more requirement(s) (REQ),
ii) a description (DCS),
iii) an optional or site-specific requirement (OSR), or
iv) is part of one or more other requirement(s) derived from one or more other subsection(s) and set(s) of text therein.

The classifier module 206 can input REQ, DCS or OSR into the label column, or a requirement that is addressed elsewhere, with the label being "RAE" if the text is derived from one or more other subsection(s). This can be done by using the labels REQ, DCS and OSR or any suitable textual equivalent thereof. The DCS column need not be labelled as such, but if so identified it can be omitted from subsequent text analysis sections, and thus this identifier or its equivalent is useful in streamlining.

For subsections where the text is derived from one or more other subsection(s), the merger module 210 can determine if such subsection is part of one other requirement (such subsection hereinafter referred to as an OR conjunction) or more than one other requirement (such subsection hereinafter referred to as an AND conjunction). For example, if a subsection states that the subject person or company must do one of the following and lists three sub-subsections, each of which is an acceptable compliant option, the subsection would be determined to be an OR conjunction. By contrast, if a subsection states that the subject person or company must do all of the following and lists three sub-subsections, each of which must be done to be compliant, the subsection would be determined to be an AND conjunction.

For subsections which are determined to be OR conjunctions, the merger module 210 can create a description of the single combined requirement by consolidating (or merging) the text of said subsection with the text of the sub-subsections to which it refers and identifying only that row associated with the subsection as a unique, single REQ in the label column. For the sub-subsections, however, the label column can labelled RAE. In other words, the text portions of OR requirements are merged into a single row, but each of the rows still exist, making updates and rule changes easier to implement. Plus, only a single row containing the consolidated text is labelled REQ, and the count of requirements remains correct.

In some cases, the original text can be retained as is, and can create a requirement description column for any modified text (merged or split), or if there is no modified text, the original text is placed into this column. Thus, merged or split text is contained in this requirement description column, but the original text is retained in the text column. While not strictly essential to have the two text columns, this can allow for easier updating of the model to changes; for example, rule changes.

For subsections which are determined to be AND conjunctions leaving the label column for that subsection row blank (assuming that the entry contains command language, but no substantive instructions), and for sub-subsections that are each a subsection of an AND conjunction, the merger module 210 can identify each row associated with each subsubsection as a unique and single REQ in the label column, and create and placing a description of the requirement in the requirement description column. For example, if part 63 says that one "shall perform the following" and then lists subparts i) ii) and iii), then part 63 will not be labelled REQ, but each of i) ii) and iii) will be labelled REQ. For these simple examples, the text of 63 can be left as is. However, on other cases, the text of part 63 can be consolidated with each of subparts i) ii) and iii) the same way that OR text can be consolidated or merged. By contrast, if part 63 did contain a substantive requirement, such as one "shall provide an eye wash station, and shall also provide the following i) ii) and iii)," then part 63 will be labelled REQ, as well as subparts i), ii) and iii) will be labelled REQ.

For each subsection or sub-subsection that has been labeled as a REQ in the label column, the merger module 210 can determine if the text of the subsection or sub-subsection constitutes more than one unique requirement, and if so, create new rows in the model such that each unique requirement is represented in separate rows in the requirement description column. In other words, text that lists more than one requirement can be split into separate rows.

For each subsection that is determined to be an AND conjunction, the classifier module 206 can further determine if the text indicates that said subsection should be treated as an OR conjunction according to any of the following exception rules:

Notifications—text which requires a person or company to notify a regulating agency and includes multiple sub-subsections are treated as an OR conjunction. This is by convention in some industries, and all notice requirements are listed together (merged) in the requirement description column.

Inspections—text which requires a person or company to perform an inspection with multiple items to check for each inspection contained in multiple subsubsections are treated as an OR conjunction and merged in the requirement description column. As above, this is conventional in some industries.

Reporting—text which requires a person or company to report on a test, observation, or other compliant action and includes multiple sub-subsections are treated as an OR conjunction and merged in the requirement description column.

The table can be updated after each merger or split described herein (or at the end thereof), so that all columns are correctly populated.

At block 408, the splitter module 208 performs splitting by examining each citation that has been labeled as a requirement, or an optional or site-specific requirement sentence-by-sentence to determine whether it constitutes more than one requirement. If there is more than one requirement in such citations, they will be broken up or split into separate rows of the output table.

At block 410, the merger module 210 performs merging on the content by determining each node's relationship with its children and parent based on the regulatory language. In some cases, the merger module 210 can also update some of the labels from the classifier based on the regulatory language and parent-child relationship.

Figure 22:
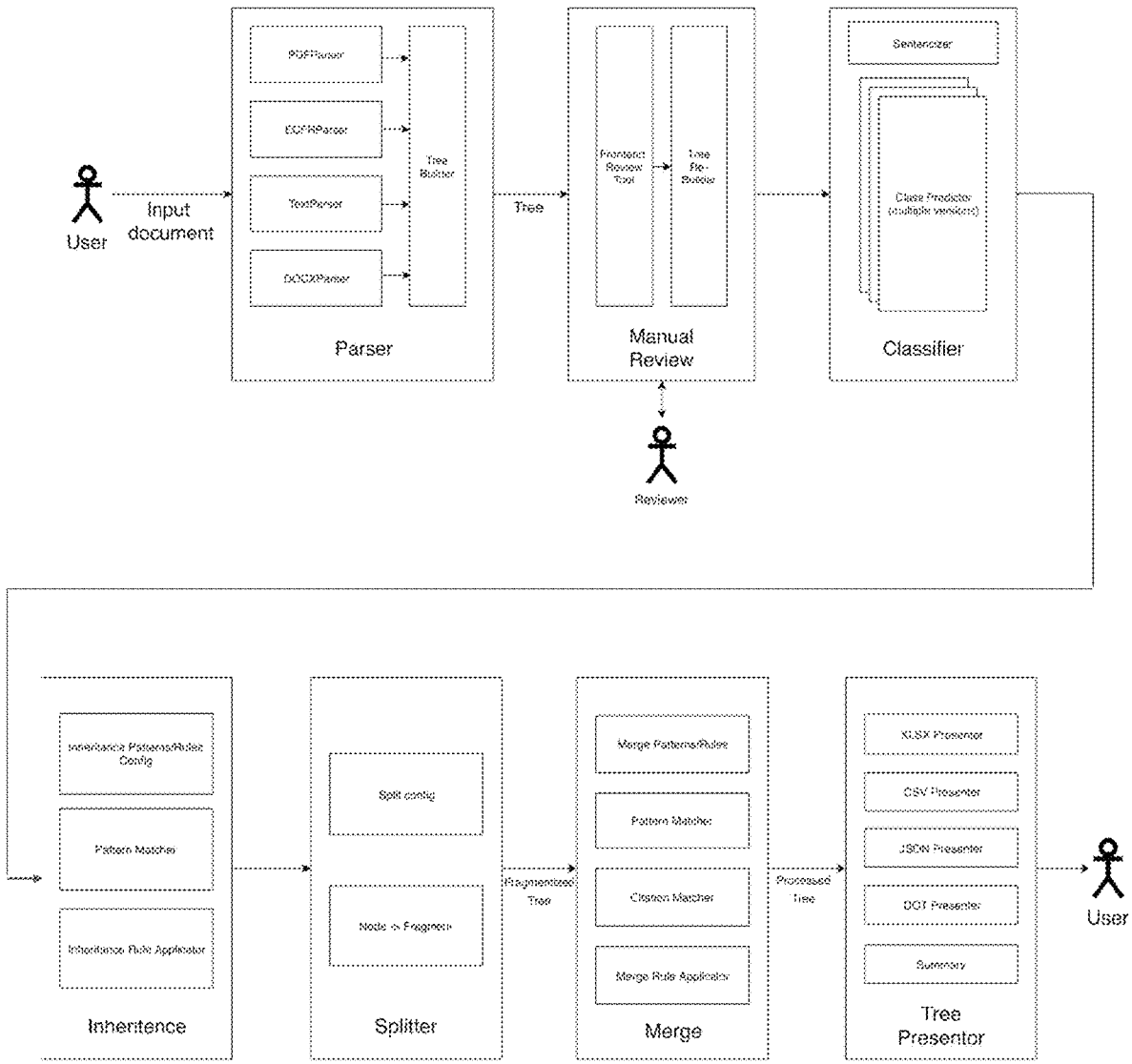
FIG. 22 illustrates an example implementation of the method of FIG. 2.

At block 412, the splitter module 208 can display or print the final table or model to an output device, which can be used to track compliance with the regulatory content An example implementation of method 400 is shown in FIG. 22. As exemplified, the parser module 204 can build an initial tree structure (i.e., a representation of the parent-child relationships). In some cases, the parser module 204 can have two sub-modules: (a) data extractor, and (b) tree builder. In some cases, the tree builder can have two steps: (a) citation extractor, and (b) hierarchy extractor. In some cases, the data can be cleaned before entering the processing pipeline. The data extractor sub-module can remove unwanted text components such as a cover letter, table of contents, list of figures, list of abbreviations, header-footer, and the like. In an example, the data extractor sub-module can include four methods including PDFParser, ECFR-Parser, TextParser, and DOCXParse which takes in raw documents and standardizes them into text format. In some cases, such as .pdf files, Optical Character Recognition (OCR) can be used to convert the raw files to text format using an external library such as Amazon Textract. When tables are identified, their text is extracted and is kept separate from the main body of extracted text. The tables can be extracted in raw format and stored for later referencing. In later stages, the citations from the main body of text are linked to the citations of a table, allowing for referencing.

In the citation extractor step of the tree builder sub-module, the document can be broken down into a list of discrete sections or subsections. Discrete sections or subsections can be analyzed to determine whether they have a citation associated with them at the beginning of the discrete section or subsection. The citation extractor sub-module can extract the citation and its corresponding text. Note that cross-references to other citations within the text can be processed differently. Discrete sections or subsections without a citation can be merged into the latest text with a citation one by one. Citations can be extracted using "regular expression" techniques. Note that regular expression is a powerful template matching technique and is highly accurate when citations follow standardized formats such as citations in Electronic Code of Federal Regulations (e-CFR) and state regulations. A standardized format means a sequence of Roman numbers, Arabic numbers, English letters, and standard citation-separators (e.g., period, colon, parenthesis, hyphen, and bracket).

The initial tree structure can be built in the "hierarchy extractor" step of the tree builder sub-module using the parent-child relationships that are determined based on citation format. This submodule extracts the document hierarchy and places the corresponding texts to nodes of a tree. The nodes are determined to be either children or parents of other nodes by their citation formats. For example, 60.414b (a) is clearly a child of 60.414b. In an example approach, nodes can be processed in a top-down approach and only consecutive nodes compared, i.e., a node is always compared with the latest node placed in the tree. If a relationship can be defined (parent, child, or sibling), it is placed in the tree; otherwise, its text is merged into the latest node. In some cases, whether two consecutive citations have the same levels and same formats can be checked. Knowing the levels and formats, the parser module 204 can determine whether two consecutive nodes are siblings (same level and same format) or have a parent-child (different level and different format) relationship. The parser module 204 can be robust to complete versus partial citation formats. For example, a document may have the citation formats 1., (a), (b). The parser module 204 can interpret the full citation for each is 1., 1.(a), 1.(b). Conversely, the parser module 204 may see citation formats I.I, I.II, I.III. The parser module 204 can recognize that these citation formats are complete and will not adjust them.

In some cases, a manual review tool associated with the parser module 204 can be used, via the interface module 268, to provide an interactive interface to a user by showing a view of the content where the citations/conditions extracted in the parser module 204 are highlighted for review. This toll can allow the user to manually modify citations by either adding citations missed by the parser module 204, or removing citations mistakenly identified by the parser module 204. After making adjustments on the extracted citations, the parser module 204 can rebuild the tree (i.e., the hierarchy extractor sub-module will re-execute using a new list of user-defined citations) using the modified list of citations that replaced the output of the original citation extractor. In an example, a frontend review tool of the manual review tool can allow the user to manually edit which citations are identified by the tree, and a tree building tool of the manual review tool can rebuild the tree based on the citations obtained from the frontend-review.

The classifier module 206 can be used to determine an associated type of citation. The classifier module 206 can determine whether the text fragments built in the parser module 204 has a requirement or description type of content.

The annotated data received by the experts can be directly used in this module. In some cases, the classifier module 206 can be domain insensitive and implemented using data labeled according to linguistic contents. In this example, there are two sub-components. A sentencizer to split each node's text fragment into sentences; the sentences can be extracted based on the English language's semantics and syntaxes. A class predictor for determining a class-label for each sentence obtained from the sentencizer. To do this, a classification model can be trained from annotated samples of sentences; where sentences can be classified as either a REQ, DSC or OSR.

In some cases, an inheritance tool associated with the classifier module 206 to enhance the classification labels and the tree structure (mixed). For example, template-matching techniques can be used to determine DSC_MODIFIER and OSR_MODIFIER patterns in the text fragments that lead to overwriting the classification labels of the node descendant to DSC. In some cases, template-matching techniques can be used to determine DEFINITION pattern leads to eliminating the node and its descendants (set the visibility flags to False) from the tree structure. There are three main sub-modules of the inheritance tool. Inheritance rules configuration can be used to set the patterns that are utilized to specify DSC_MODIFIER, OSR_MODIFIER, and DEFINITION. Pattern Matcher can be used to determine if a sentence matches any of the patterns above and assigning one or multiple inheritance tags to each sentence. Inheritance rules applicator can use the parent-child relationship information and distribute the inheritance tags from the parent to all subsequent children.

The splitter module 208 can be used to enhance the tree structure by ensuring that there is one (and only one) requirement in a node. For each node in the tree, the splitter module 208 can analyze each citation and its corresponding text fragment. The splitter module 208 can split the text-fragments into sentences and identify if more than one requirement (REQ or OSR) is present. If there is more than one requirement in such text fragments, the splitter module 208 can split it into separate text fragments where each fragment consists of only one requirement. In this example, the splitter module 208 can have two sub-modules. Splitter configuration can be used to determine whether a split is enabled. The split could be disabled entirely in a content type (such as Permit) or only partially in a particular content using an inheritance rule. Node to fragment can be used if the splitter module 208 is enabled. This sub-module can break a paragraph to multiple text fragments where each only contains a single requirement.

The merger module 210 can be used to enhance the tree structure by determining types of the parent-child relationship. In some cases, this can be domain sensitive and can be used to improve the classification labelling. In the merger module 210, the relationship of each node with its children and parent can be re-visited using, for example, template-matching techniques and the standard regulatory language in EHS documents. To do so, the merger module 210 can update some of the classification labels within the parent-child structure. For example, all the children of "Alternative Means of Compliance" subsection would be labeled as OSR (optional or site-specific requirement), in case they have already been labeled as REQ by the classifier module 206. In some cases, there can be different types of merge strategies (parent-child relationships) such as OR1, OR2, OR1_CITE, AND, AND_EXCEPTION, AND_CITE. In this example, the merger module 210 can have four sub-modules. Merge rules/patterns can specify the patterns corresponding to merge rules. Pattern matcher, similar to the inheritance sub-module, can detect a list of pre-defined scenarios specified by a domain expert. In some cases, a "regular expression" technique can be used to determine the occurrence of those scenarios in the current implementation. After detecting a scenario, the classification labels and tree structure can be changed. Citation matcher can match citations referred within sentences. Additionally, the corresponding children to the matched citations can be identified. For example, in a sentence such as "the facility should comply with (a) through (d)", the citation matcher identifies four children corresponding to (a), (b), (c), and (d). Merge rule applicator, given the merge rule patterns and children from the citation matcher, can combine the conditions and outputs the final requirements and applicable requirement descriptions.

The output module 212 can present the output to the user via the interface module 268. In this example, a tree presenter can be used to take the finalized tree, extract relevant information, and reformat it to be utilized by the user. In this example, five tree presenters can render a tree and present the result. XLSX presenter can render a tree and generates a Microsoft Excel sheet. CSV presenter can render a tree and generates a comma-separated values file. JSON presenter can render a tree and generate JavaScript object notation (JSON) data format; for example, to present the data in a web portal or extracted via API calls. DOT presenter can render a tree and generate graph description language file known as DOT; for example, to be used for graph tree visualization. Summary can generate a summary of the output such as the total number of requirements, total word count, and the like.

The present inventors conducted example experiments to verify the advantages of the present embodiments. The input regulatory content was stored in a text document, in this case a Microsoft Word.docx format, but any text format could be used. The text had several sections and subsections, sometimes many nested levels of subsections. For the example experiment, 40 CFR 60 Subpart Kb was used as the input text. CFR refers to the United States Code of Federal Regulations. 40 CFR relates to environmental protection regulations, and this particular set of regulations relates to volatile organic compounds. The following depicts, as an example, one of the subsections in this part of the Code of Federal Regulations. As discussed below, the regulatory content of each section consists of a set of numbered lists, these also contain other numbered lists, all having substantial text.

"§ 60.112b Standard for volatile organic compounds (VOC).

(a) The owner or operator of each storage vessel either with a design capacity greater than or equal to 151 m 3containing a VOL that, as stored, has a maximum true vapor pressure equal to or greater than 5.2 kPa but less than 76.6 kPa or with a design capacity greater than or equal to 75 m 3 but less than 151 m 3containing a VOL that, as stored, has a maximum true vapor pressure equal to or greater than 27.6 kPa but less than 76.6 kPa, shall equip each storage vessel with one of the following:

(1) A fixed roof in combination with an internal floating roof meeting the following specifications:

(i) The internal floating roof shall rest or float on the liquid surface (but not necessarily in complete contact with it) inside a storage vessel that has a fixed roof. The internal floating roof shall be floating on the liquid surface at all times, except during initial fill and during those intervals when the storage vessel is completely emptied or subsequently emptied and refilled. When the roof is resting on the leg supports, the process of filling, emptying, or refilling shall be continuous and shall be accomplished as rapidly as possible.

(ii) Each internal floating roof shall be equipped with one of the following closure devices between the wall of the storage vessel and the edge of the internal floating roof:

(A) A foam- or liquid-filled seal mounted in contact with the liquid (liquid-mounted seal). A liquid-mounted seal means a foam- or liquid-filled seal mounted in contact with the liquid between the wall of the storage vessel and the floating roof continuously around the circumference of the tank.

(B) Two seals mounted one above the other so that each forms a continuous closure that completely covers the space between the wall of the storage vessel and the edge of the internal floating roof. The lower seal may be vapor-mounted, but both must be continuous.

(C) A mechanical shoe seal. A mechanical shoe seal is a metal sheet held vertically against the wall of the storage vessel by springs or weighted levers and is connected by braces to the floating roof. A flexible coated fabric (envelope) spans the annular space between the metal sheet and the floating roof.

(iii) Each opening in a noncontact internal floating roof except for automatic bleeder vents (vacuum breaker vents) and the rim space vents is to provide a projection below the liquid surface."

To extract the applicable citations from a regulatory content, the text of each numbered list can be parsed by the parser module 204 into a separate row of a table called, for example, the Desired Output table. Also, the citation number for each row can be extracted from the numbered lists. For example, in the above example, the extracted citation numbers would be 60.112b, 60.112b(a), 60.112b(a)(1), 60.112b(a)(1)(i), 60.112b(a)(1)(ii), 60.112b(a)(1)(ii)(A), 60.112b(a)(1)(ii)(B), 60.112b(a)(1)(ii)(C), and 60.112b(a)(1)(iii).

After extracting the citation numbers and texts into a table, another column called Label can be added to track whether or not the citation is an applicable requirement or just a description. A fourth column can be added to the Desired Output table and called Referable Citations. This column includes every citation number that is related to, and therefore, referable in the applicable citations. Citations that can be considered as descriptions typically do not have referable citations.

A column called Applicable Requirement Description can also be added, which will have a copy of the extracted or consolidated portions of each applicable requirement. This column essentially contains applicable text relating to a single requirement.

FIG. 3 shows an example of a desired output generated from the Subpart Kb subsection example explained above. Note that sometimes several rows are created for a single citation, if the citation contains more than one applicable requirement.

In an example, parsing by the parser module 204 can include feeding a regulatory document into the parser module 204 where the citation/condition numbers are extracted from the text and used to build a representation of the document. The relationships between nodes in a tree representation represent a relationship of the citations/conditions in the text. The nodes are determined to be either children or parents of other nodes by their citation/condition number. For example, 60.414b(a) is a child of 60.414b. These nodes can have attributes attached to them, including but not limited to, machine learning label, split fragments, and merging rules, as described herein. The parser module 204 can be robust to document type, as long as there is some kind of hierarchy, without requiring a certain citation/condition structure. The parser module 204 can also be robust to complete vs partial citation/conditions within the document. For example, a document may have the citation/condition numbers 1., (a), (b). The parser module 204 can understand the full citation for each is 1., 1.(a), 1.(b). In other cases, the parser module 204 may see citation/condition numbers in a document in another form, for example I.I, I.II, I.III. The parser module 204 can understand these citation/condition numbers are already complete within the document and will not adjust them. Another function of the parser module 204 can include the ability to differentiate between citation/condition numbers referenced within text and as the ID for the text. If the parser module 204 sees a citation/condition number within the text, it knows it is a word that is part of the text, not an ID, meaning the parser will not create a new node for it. Advantageously, the parsing undertaken by the parser module 204 can provide improved robustness and scalability.

The parser module 204 can be used to extract citation numbers and related citation numbers, populated under, for example, the first two columns of the desired output table.

The classifier module 206 can use machine learning to label citation paragraphs and sentences as requirements (REQ), descriptions (DCS), or optional and site-specific requirements (OSR). Steps performed by this module can include:

Extract features based on the regulatory language to classify citations into requirements (REQ), descriptions (DCS), or optional requirements and site-specific requirements (OSR).

Train the Machine Learning model with a training set and predict labels for the test set.

Test the accuracy of the classification model and tune it.

The merger module 210 can be used to introduce rule-based mechanisms that derive relationships between citations and update citation labels based on the rules explained herein. In some cases, steps performed by this module can be applied to requirement, optional or site-specific requirement, and blank rows, not mere description rows, including:

Extract or identify AND, OR, and NON (no conjunction) patterns based on the parent-child relationship and the regulatory language:

A citation with AND conjunction pattern is defined as the parent in a "Conjunction with Multiple Requirements". In these citations, every direct child represents at least one requirement. Example of key phrases in the citation text include: "meeting the following specifications", "provide the following," "meeting the following criteria," "shall perform the following," or "must provide".

A citation with OR conjunction pattern is defined as the parent in a "Conjunction with One Requirement". This essentially means that it contains a key phrase that indicates it will be combined with all of its direct children to form a single requirement. Example of key phrases in the citation text include "shall [VERB] . . . [OBJECT] . . . one of the following:", "must [VERB] one of the following:", and "must [VERB] one of the following options:" or "shall provide i) ii) or iii)."

A citation with the NON pattern indicates that the citation text does not include any of the phrases associated with AND nor OR patterns. Such label may be optional.

Update labels for citations if necessary.

Determine Referable Citations for each citation.

Based extracting or identifying AND, OR, and NON, determine if two or more citations constitute only one REQ or OSR, and if so, merge or consolidate them with the resulting combined text stored under Applicable Requirement Description column of the appropriate citation and update other columns of the table.

Natural language processing (NLP) can be applied to nodes/fragments of the text to classify the parent fragment as either a conjunction with multiple requirements (CWMR), conjunction with one requirement (CWOR), CWMR & CWOR, notification reporting and recordkeeping (NRR), or None. Pattern recognition techniques can be used to aid in the understanding of which exact children are being referenced in the parent fragment. The classifier module 206 can use the machine learning model trained on output of documents with labelled examples of the above merging rules. The use of machine learning over a strictly rule-based merger allows for improved scalability, as well for the enabled use of other tools to improve model performance with human in the loop annotation/training.

The system 200 can facilitate human in the loop for the classifier module 206, and for example the merger and inheritance rules of the system 20, through human annotation of data. During a session, in an example, a user can elect to annotate REQ, DSC, or OSR labels, or merger rules. After making a selection, the interface module 268 can present to the user a piece of text and the classified label and or merger rule from the current models, along with a way of indicating whether or not the classification label and merger rule was correct (binary response). In an example, possible classification rules include REQ, OSR, and DSC and possible merger rules include CWMR, CWOR, NRR, CWMR & CWOR, and None. The piece of text the user is presented with can come from the aggregation of multiple documents nodes, that are classified by the current existing model and then shuffled before presenting them to the user, so that there is no context other than the node in view. After the user has given their response or elects to ignore the current text and label, they can be presented with the next node. This approach allows for a filtered subset of nodes to be presented to the annotator that can be considered important based on, for example, a variety of metrics. These important nodes can include nodes with low confidence label classifications to help build confidence, very high confidence nodes to, for example, verify the model has not learned a non-generalizable rule, OSR labels to help build on the current small sample set of OSR training data. In some cases, merging rules can be only dependent on the parents rule being recognized, so these rules can be learned without the user having any reference or understanding of the children. It follows that given a child of a merger rule, that is on its own (void of context of the parent) a DSC, providing a binary response indicating the correctness of this will not affect the learning of the merging rules, given that it is the parent that is important. After a certain amount of annotations are collected, the model can be re-trained by the classifier module 206 and tests can be run to ensure the model is performing at a certain level of accuracy.

In some cases, not all nodes with a parent-child structure will have a merging relationship that accompanies CWOR, CWMR, NRR, and CWMR & CWOR. In this case, the rule 'None' can be applied. If the parent is a description, and does not include action language like "shall do the following:" or "must comply with one of the following:" there is generally no merging relationship between the parent and its respective children. The decision to not merge can be made using a combination of information, including the label on the parent, the parent-child relationship, and the patterns within the fragment that are recognized by pattern recognition.

In some cases, pre-processing can be used by the parser module 204 to ensure correct identification of citation/condition structure in regulatory content. The user can be presented, via the interface module 268, with a range of the regulatory document which they would like to process, after which they can opt to 'review citations' or 'review conditions' (depending on document type). If this option is selected, the selected range of the document are sent through the parser module 204 where the recognized citation/condition hierarchical structure can be established. Upon review, the user can be presented with a view of the document where the citation/condition numbers recognized by the parser are highlighted for their review/approval. If a citation/condition number is 'missed' by the parser module 204, the user can elect to highlight it to indicate its inclusion in the overall hierarchy. If text was mistakenly detected as a citation/condition number, the user can elect to 'remove' it from the hierarchy.

The splitter module 208 determines if for each REQ and OSR citation there is more than one requirement and, in this case, splits the citation into 2 or more rows and updates all necessary fields. Thus, the split text is separated into two rows, each portion can be stored under the Applicable Requirement Description column.

The parser module 204 can process the text and construct it into a tree structure. In an embodiment, the parser module 204 can include cleaning up and validating the input. In this step, the input file format is validated, and if necessary, the file is transformed to a text format. Also, invalid and text-editor specific characters can be "trimmed" from the file.

The parser module 204 can extract citation number and citation text for each paragraph (node). In this step, regular expressions are used to detect the citation patterns (e.g., 60.112.b). The regular expression for detecting the patterns in the regulatory content can be complex because it should detect the patterns for multiple scenarios such as citations in the middle of a sentence. After extracting the citations, the paragraphs (or nodes) are identified as the text between citations.

Figure 4:
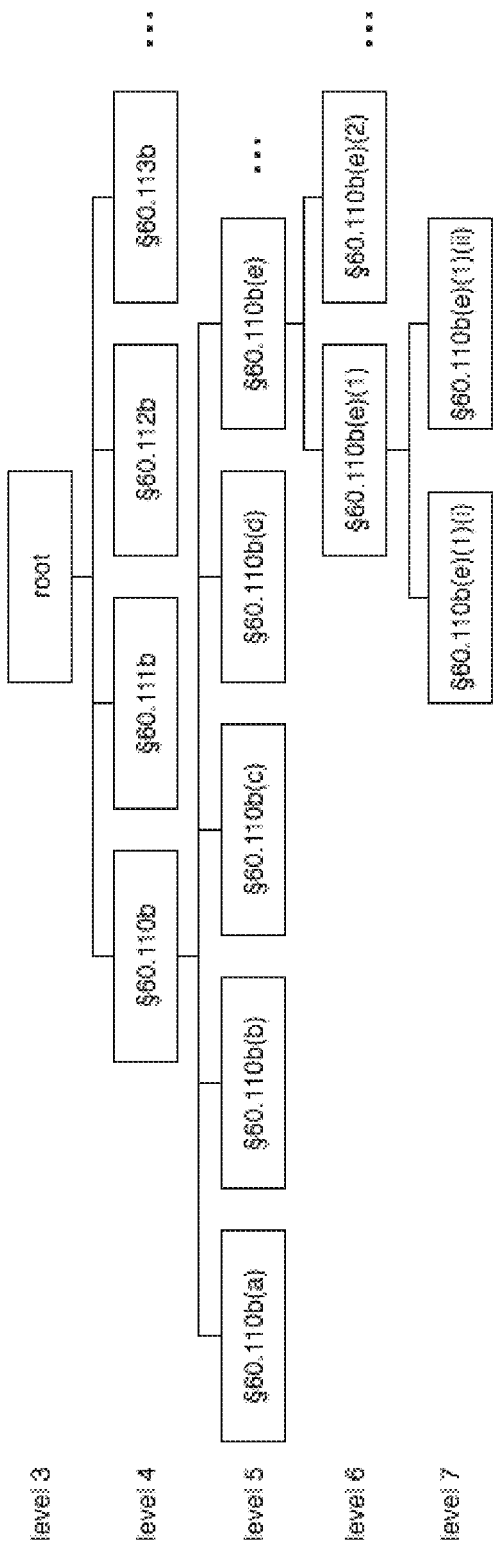
FIG. 4 shows an example of a tree structure that represents a node in the example of FIG. 3.

The parser module 204 can build a tree structure and position each node in the structure. As soon as the citations and corresponding nodes are extracted, a tree structure is built where the nodes define the branches of the tree and the connection between the nodes define the parent-child relationship of the paragraphs. FIG. 4 shows an example of this tree structure that represents a few nodes in subpart Kb. For each node, a level can be defined, wherein higher levels represent deeper, more detailed paragraphs and nodes. To allow for further room for future subparts and provisions, a root level can be set to level 3. The depth of the tree for subpart Kb example was 8; § 60.112b(a)(1)(ii)(A), which is an example of a level 8 node.

Figure 6:
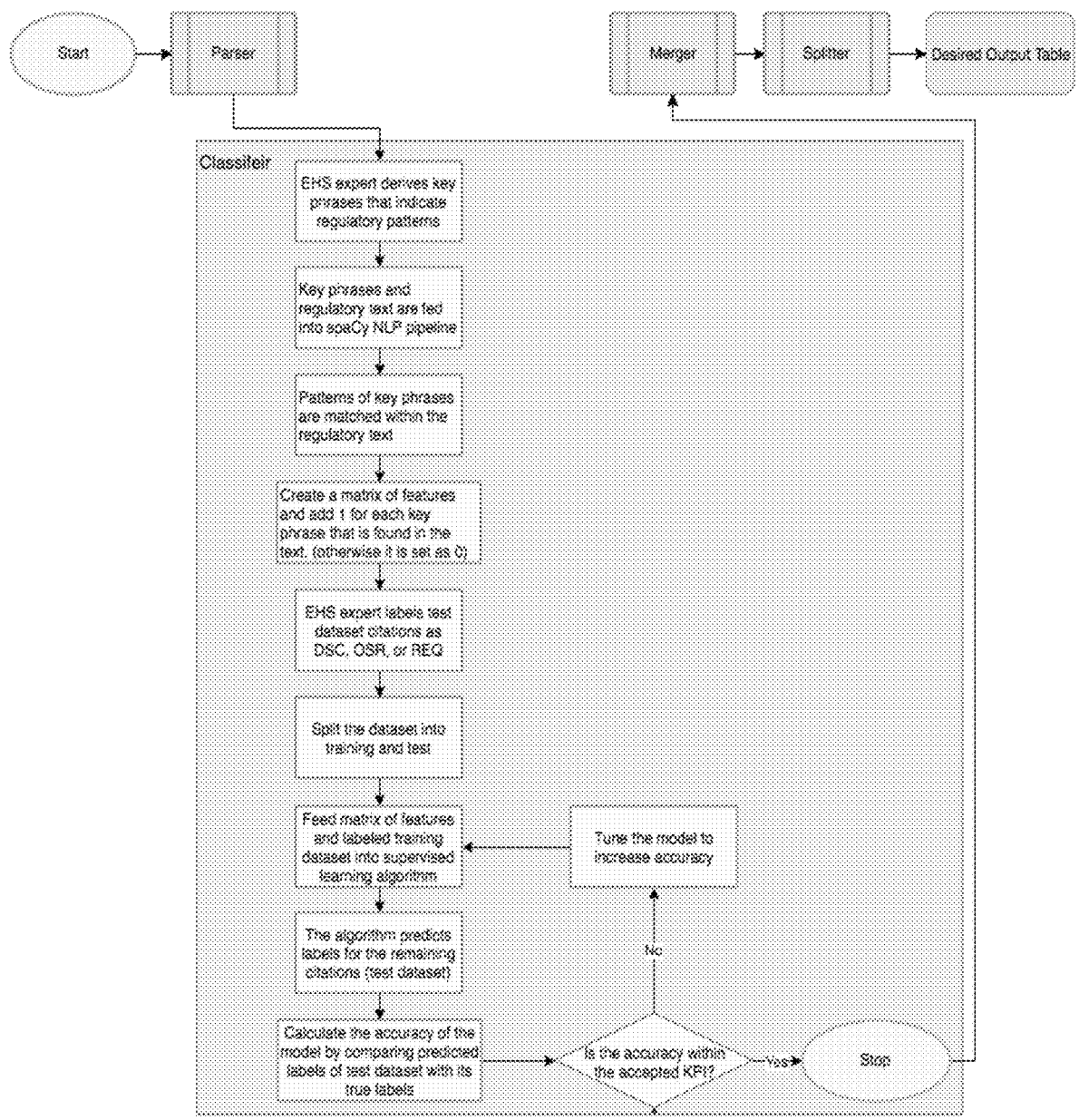
FIG. 6 is an example flow diagram for a classifier module in accordance with the system of FIG. 1.

The classifier module 206 performs the task of building a machine learning model that can predict whether citation texts, including whole paragraphs or individual sentences, are indicative of a requirement (REQ), an optional or site-specific requirement (OSR), a description (DSC), or is part of another requirement. In an embodiment, the model can use a supervised learning classification approach. The classification model can categorize citation texts into three mutually exclusive groups of REQ, DSC, and OSR, if meaningful and independent predictors can be found within the text. For this purpose, a series of key words and phrases can be used as potential predictors of the qualities and attributes in text that collectively result in a citation to be labeled as one of the three labels mentioned above (or not labelled as part of another requirement). These patterns that are introduced by domain experts act as features (predictors), and have been extracted from text using the natural language processing (NLP) methodology. Also, true labels of each citation text that can be considered as truth in the solution space are provided by experts on the same dataset. Given these inputs, the classifier can be trained with a classification algorithm based on features extracted from the citation text and labels provided by the experts. In some cases, the NLP approach can be based on a mix of the machine learning model and a set of pre-defined rules. In a particular case, the spaCy library can be used for the NLP methodology. FIG. 6 presents an example flow diagram for the classifier module 206.

Once the matrix is populated, key words and phrases introduced by the experts can be transformed into patterns that are detectable by the classifier module 206 and added a separate column to the input matrix representing each pattern. Each of these columns can be called a feature. Key phrases provided by the experts include "shall", "must", "administrator may", "choose to comply", "all" "never" "always," and the like.

Figure 5:
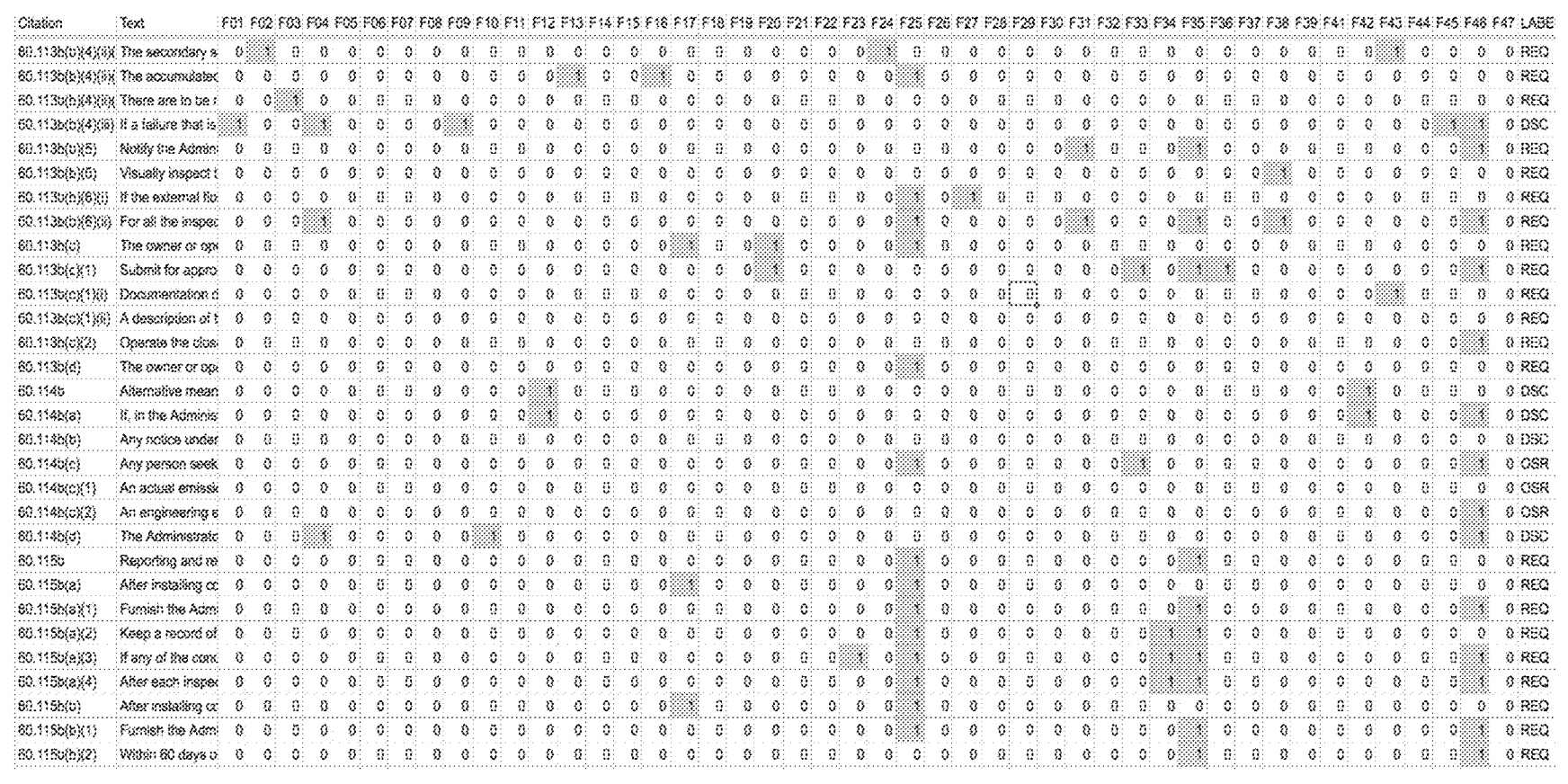

The classifier module 206 takes the input matrix and passes it through pattern recognition logic row-by-row. It populates value 1 for each pattern detected in its text under the respected column (feature), and zero for the rest of the features. This new matrix can form the input dataset to the classification approach; see the example shown in FIG. 5. This binary matrix of features can be paired with true labels of each citation text, previously provided by experts or other persons, to generate an input data set to fed into the supervised learning model. In an example, the supervised learning model can be a trained a Gradient Boosting Classifier; for example, including a three-class classification. In an example, a 5-fold cross-validation scheme can be used during the training phase to avoid overfitting this classifier to the training subset.

In some cases, a classification model from a multitude of trained classification models can be selected based on highest accuracy; for example, based on a F1 score of 0.842 (±0.067) on the training subset. In statistical analysis of binary classification, the F1 score (also F-score or Fmeasure) is a measure of a test's accuracy. It considers both the precision p and the recall r of the test to compute the score: p is the number of correct positive results divided by the number of all positive results returned by the classifier, and r is the number of correct positive results divided by the number of all relevant samples (all samples that should have been identified as positive). The F1 score is the harmonic average of the precision and recall, where an F1 score reaches its best value at 1 (perfect precision and recall) and worst at 0.

The classification model can be used to predict labels of citation texts in the test subset and the accuracy of predictions on the test subset can be determined such that the model can be tuned as needed.

Figure 7:
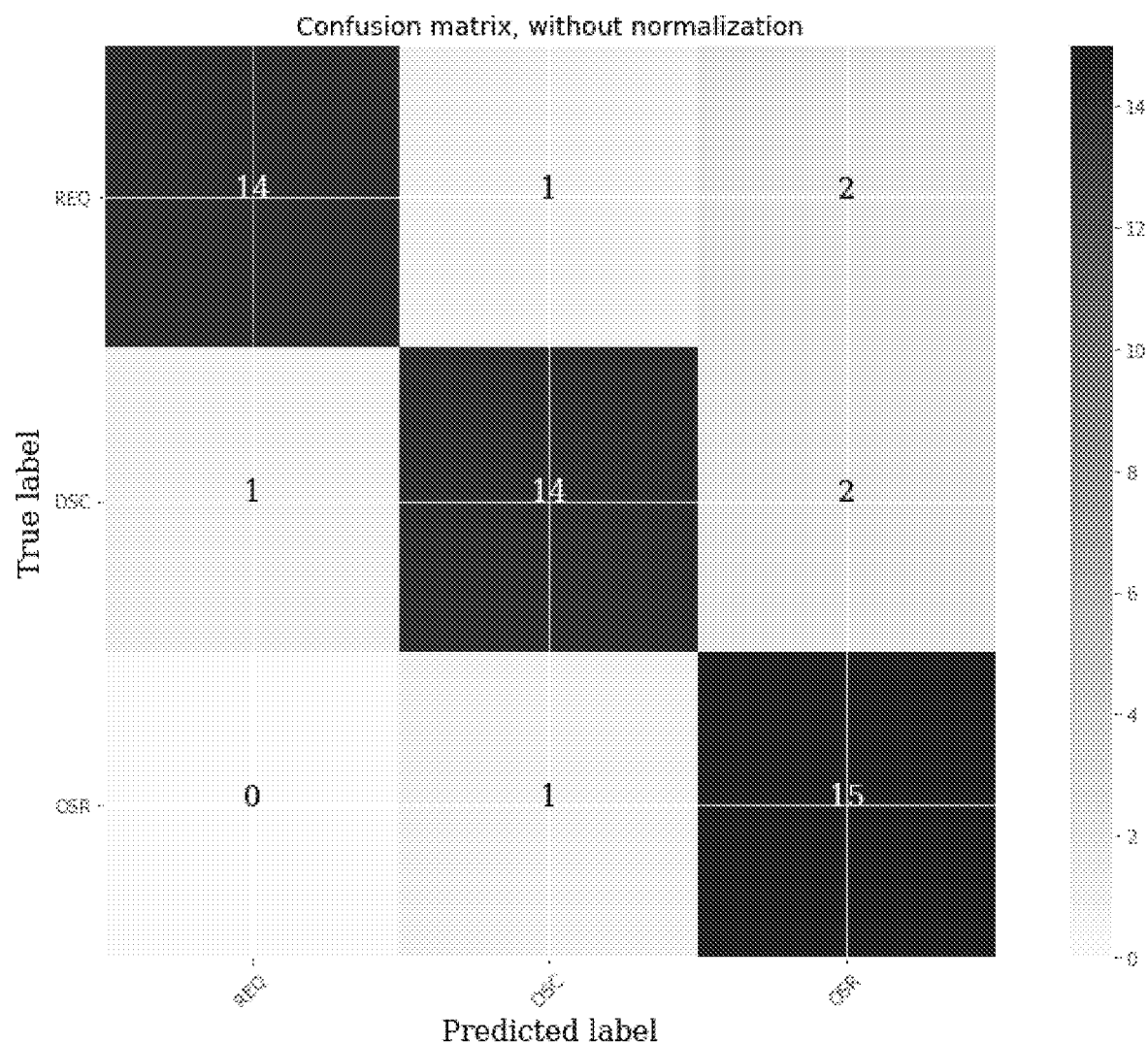
FIG. 7 shows an example confusion matrix visualizing the performance of a classifier, in accordance with the system of FIG. 1.

In example experiments, the classification model used to predict labels of citation texts in a test subset yielded a mean prediction accuracy of 86.0%, and an F-1 score of 0.898 (±0.067). FIG. 7 shows an example confusion matrix visualizing the performance of the classifier on the test subset. The confusion matrix can be a table used to describe the performance of a classification model (or "classifier") on a set of test data for which the true values are known. Each row of the matrix represents the instances in a predicted class while each column represents the instances in an actual class (or vice versa).

The merger module 210 can be used to perform merging. In merging, each node's relationship with its children and parent can be identified based on the regulatory language. However, before applying the merger on the citations, it may be necessary to update some of the labels from the classifier based on the regulatory language and parent-child relationship. Such rules can include:

All levels of children of "Alternative Means of Compliance" subsection can be labeled as OSR (optional or site-specific requirement), in case they have already been labeled as REQ by the classifier module.

Any child (or grandchild) of a citation with "Alternative means of emissions limitation" in its body text can be labeled as OSR (optional or site-specific requirement), in case they have already been labeled as REQ by the classifier module.

All nodes in "Delegation of Authority" subsection can be labeled as DSC (description).

In an embodiment, there are three types of parent-child relationships examined by the merger module 210:

OR (conjunction with one requirement): in these types of citations, the parent node has a language that indicates itself and all its direct children create one requirement. Example phrases include "shall [verb] . . . [object] . . . one of the following:", "must [verb] one of the following:", and "must [verb] one of the following options:", or "the following subparts" are listed with an "OR" conjunction between them. Each of these indicates that an OR merge strategy is likely required. In these cases, the applicable requirement description of the parent citation should be a combination or merger of the text of the parent and all direct children. An example of desired output table for such citations is presented in FIG. 8. In some cases, although the original row structure is retained, only one is labeled as REQ (the one containing the consolidated text) so that requirements are not overcounted.

AND (conjunction with multiple requirements): in these types of citations, parent node constitutes a language that indicates that all of its direct children should be complied with by the owner as separate, independent requirements. Example phrases include "meeting the following specifications", "provide the following:" and listing the subparts with an "AND" conjunction. Each of these indicates an AND merge strategy. An example of the desired output table for such citations is presented in FIG. 9.

NON (no conjunction): these citations do not have any conjunctional relationship with each other and would each be considered as requirements (REQ or OSR).

Figure 10:
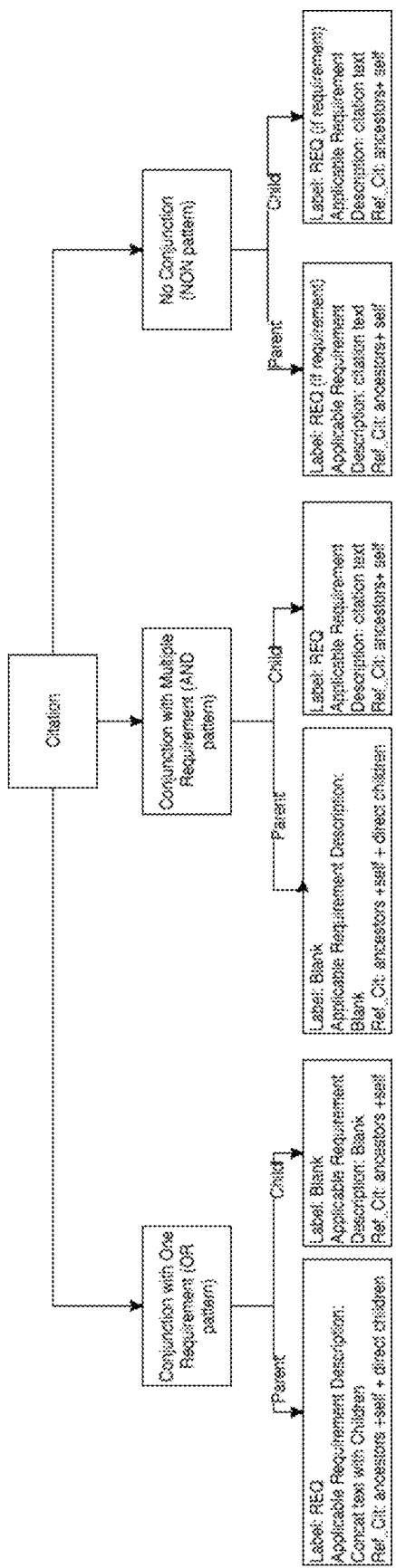
FIG. 10 shows a flow chart for an example of merge rules, in accordance with the system of FIG. 1.
Figure 11:
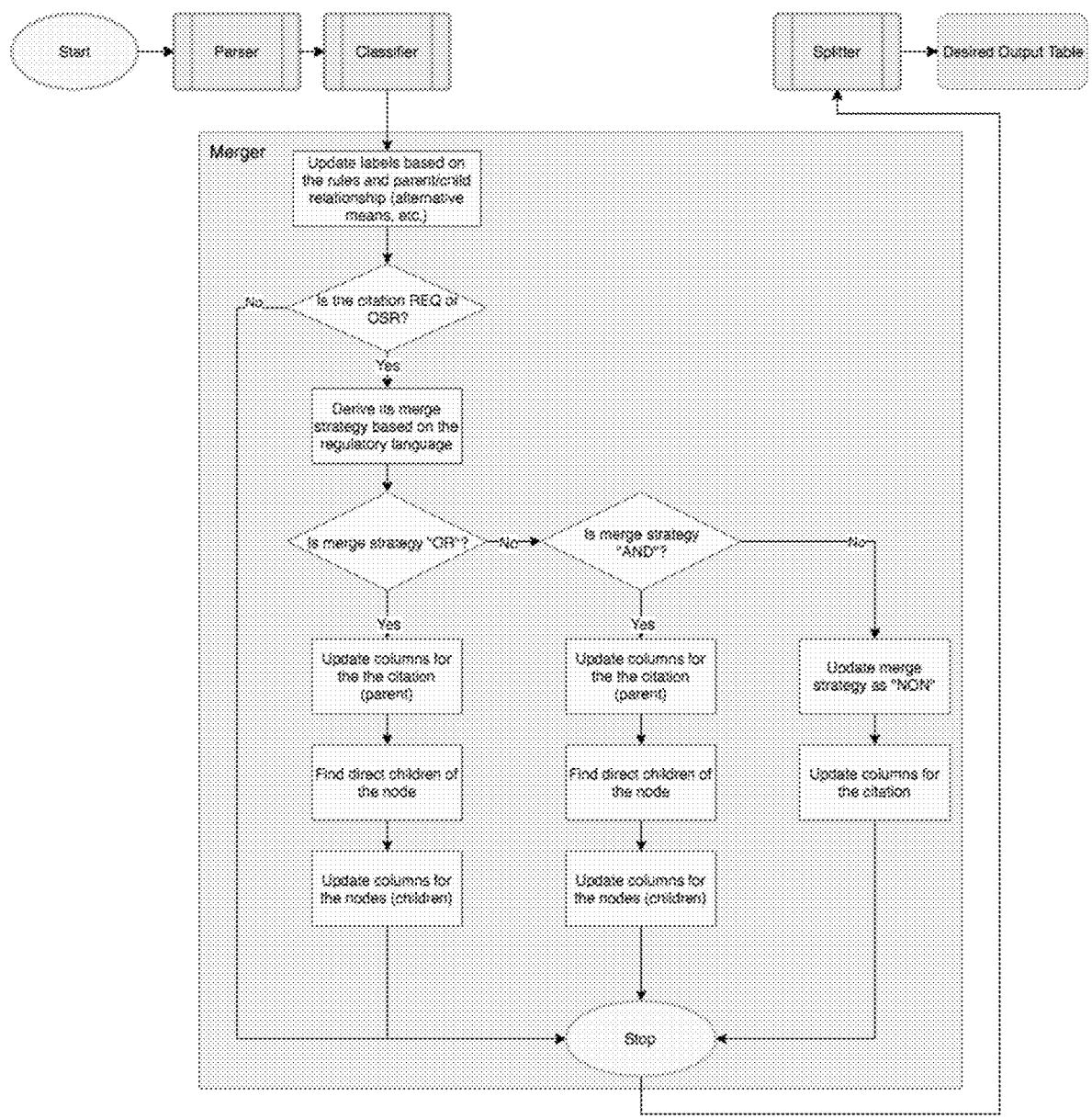
FIG. 11 is an example flow diagram for a merger module, in accordance with the system of FIG. 1.

After defining the merge strategy for each citation, columns of every row can be updated by the merger module 210 based on the rules, for example as detailed in FIG. 10. An example of the merger module 210 workflow is presented in FIG. 11.

The merger module 210 advantageously combines citation text across rows which have Parent/Child relationships into single requirements. The merger module 210 thus produces the correct Requirement Description and it ensures that rows that participate in a Requirement, but are not in themselves a Requirement, are classified as RAE (Requirement Addressed Elsewhere). Hence, the merger module 210 ensures that the correct count of Requirements is contained in the processed output.

Figure 12:
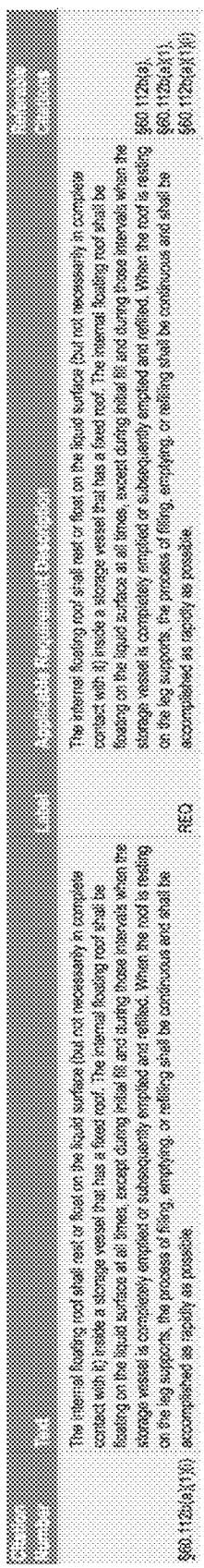
FIG. 12 shows an example of a citation before a split process, in accordance with the system of FIG. 1.
Figure 13:
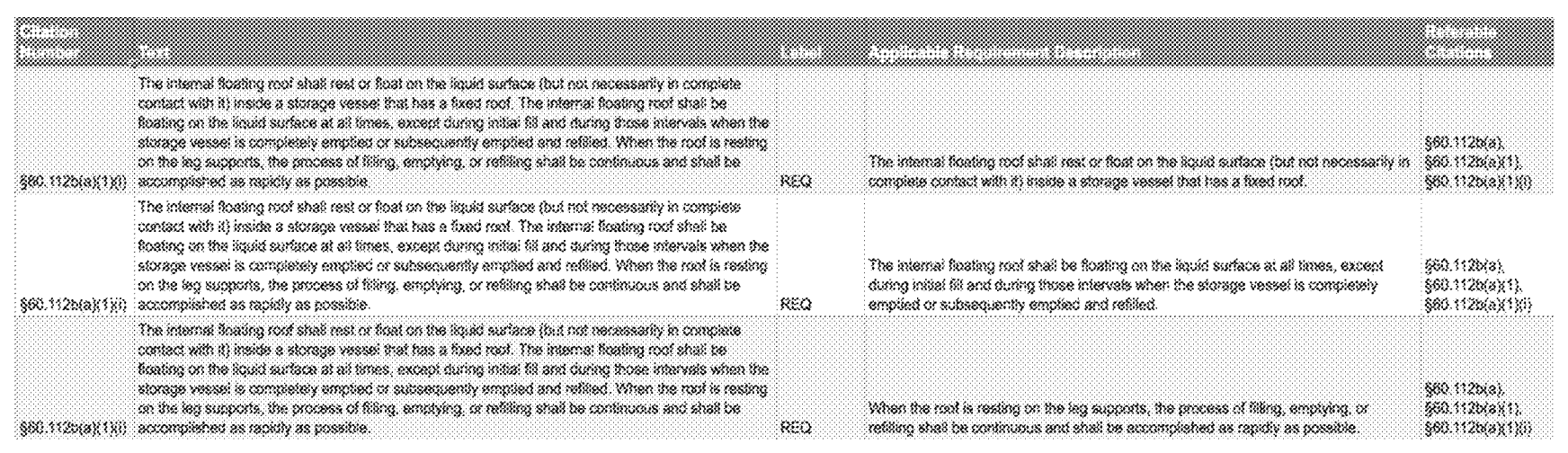
Figure 14:
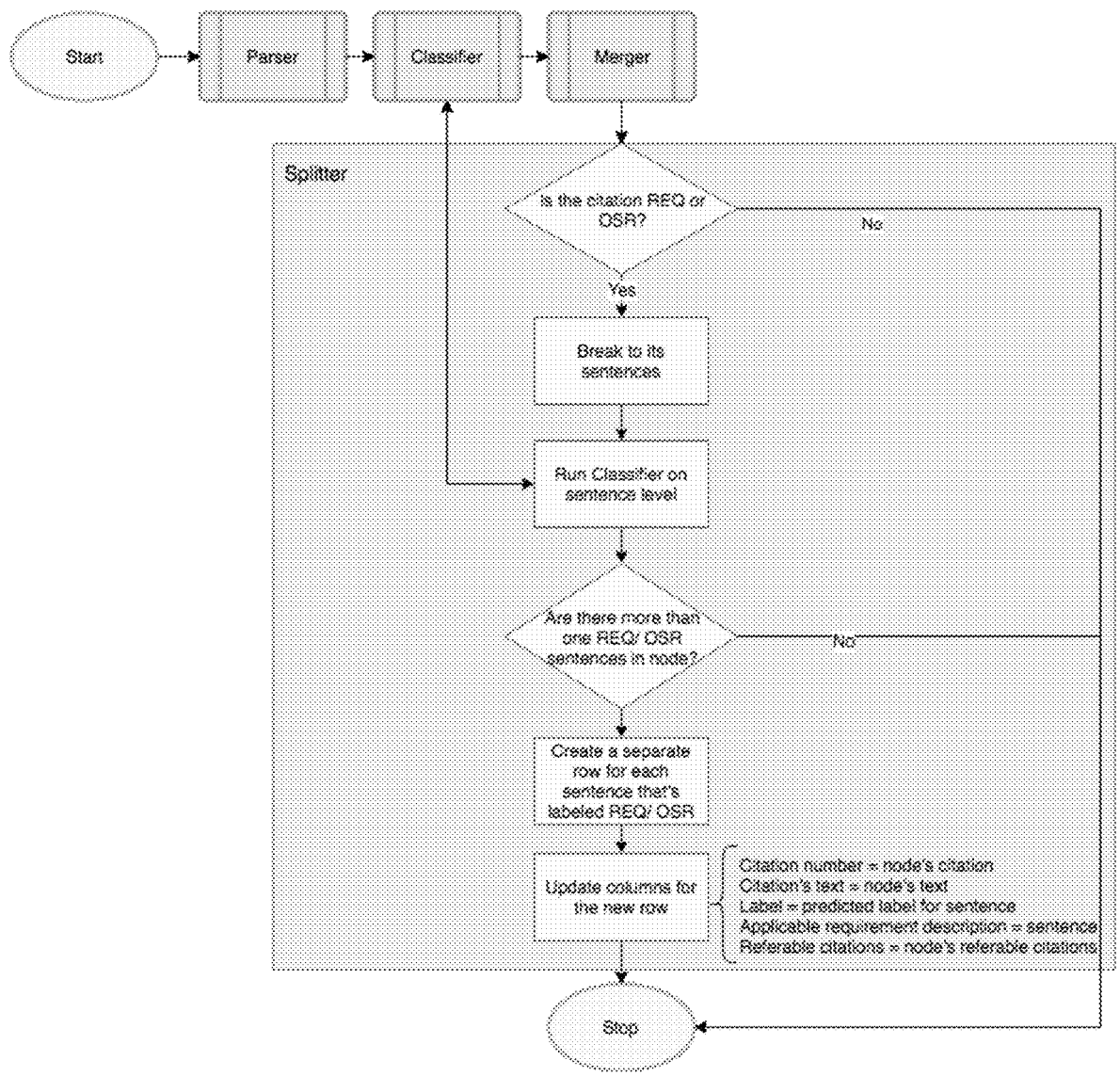
FIG. 14 is an example flow diagram for a splitter module, in accordance with the system of FIG. 1.

The splitter module 208 can examine each citation that has been labeled as a requirement, optional, or site-specific requirement sentence-by-sentence to determine whether it constitutes more than one requirement. If there is more than one requirement in such citations, they can be broken up or split into separate rows in the Applicable Requirement Description, with each row consisting of only one requirement. Citation Number, Label, Citation Text, Applicable Requirement Description, and Referable Citations columns can be populated for each recently created row. This process is also called implementation of the one-to-many rule. FIG. 12 and FIG. 13 show an example of a citation before and after the split process, respectively. An example of the splitter module 208 workflow is presented in FIG. 14.

The splitter module 208 can ensure the correct Requirement Description is contained in the processed output and ensure that the correct number of requirements are extracted into the processed output. For example, consider the regulatory text presented at 40 C.F.R. 60.112b(a)(1)(i) as shown below:
  (i) The internal floating roof shall rest or float on the liquid surface (but not necessarily in complete contact with it) inside a storage vessel that has a fixed roof. The internal floating roof shall be floating on the liquid surface at all times, except during initial fill and during those intervals when the storage vessel is completely emptied or subsequently emptied and refilled. When the roof is resting on the leg supports, the process of filling, emptying, or refilling shall be continuous and shall be accomplished as rapidly as possible.

In this example, the citation text has three separate sentences which constitute three separate requirements. The splitter module 208 can recognize this because it analyzes each sentence of every section/subsection of the document. In this example, the processed output is as exemplified in FIG. 19. Note that in this example, the single citation (40CFR60.112b(a)(1)(i)) has been split into three separate requirements because the citation text establishes three separate obligations upon the regulated entity. Note also the unique Requirement Names produced by adding the suffix to the end of the value in each row.

In another example, consider the regulatory text presented at 40 C.F.R. 60.5375a(f) to 40 C.F.R. 60.5375a(f)(3)(ii), as shown below:
  (f) For each well affected facility specified in paragraphs (f)(1) and (2) of this section, you must comply with the requirements of paragraphs (f)(3) and (4) of this section.
  * * *
  (3) You must comply with either paragraph (f)(3)(i) or (f)(3)(ii) of this section, unless you meet clearly the requirements in paragraph (g) of this section. You must also comply with paragraph (b) of this section.
  (i) Route all flowback to a completion combustion device, except in conditions that may result in a fire hazard or explosion, or where high heat emissions from a completion combustion device may negatively impact tundra, permafrost or waterways. Completion combustion devices must be equipped with a reliable continuous pilot flame.
  (ii) Route all flowback into one or more well completion vessels and commence operation of a separator unless it is technically infeasible for a separator to function. Any gas present in the flowback before the separator can function is not subject to control under this section. Capture and direct recovered gas to a completion combustion device, except in conditions that may result in a fire hazard or explosion, or where high heat emissions from a completion combustion device may negatively impact tundra, permafrost or waterways. Completion combustion devices must be equipped with a reliable continuous pilot flame.

Figure 20:
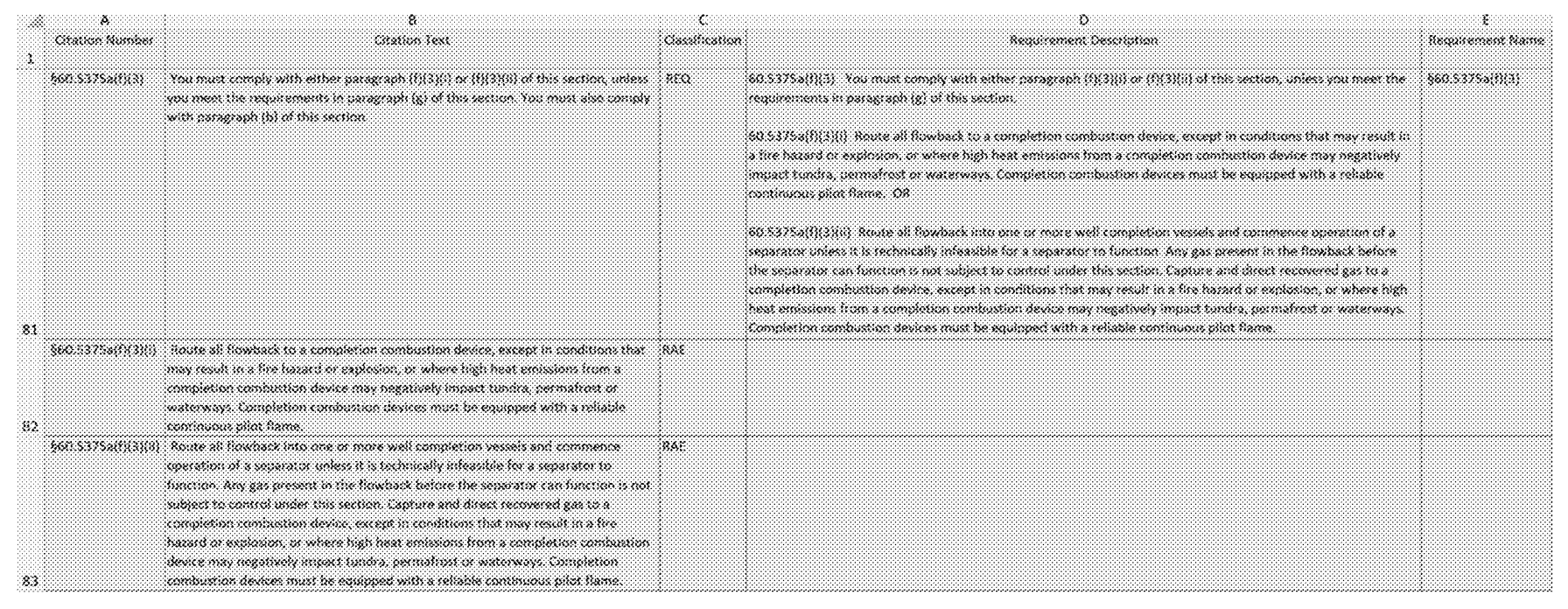
Figure 21:
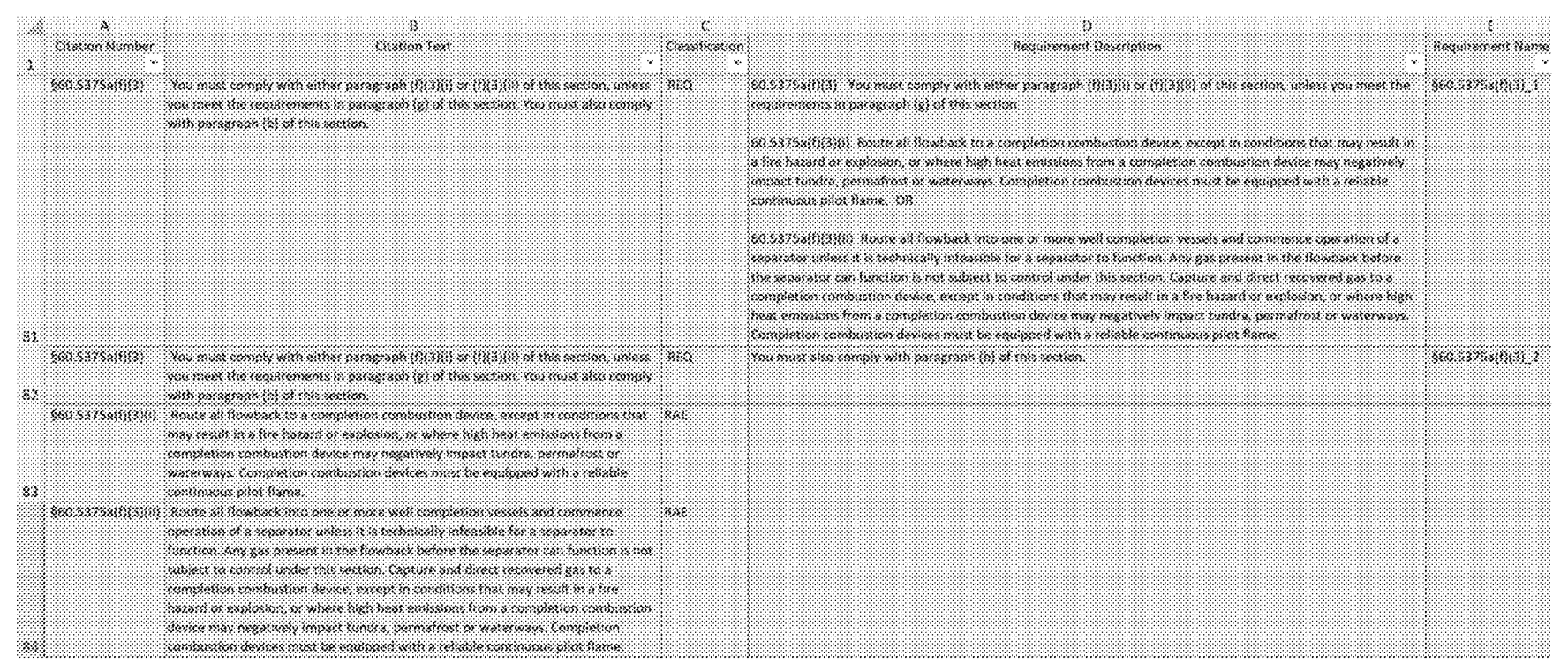

In the above example, the parent text has a first sentence which indicates that the regulated entity must comply with either of the two child subsection content; resulting in a single requirement stemming from the first sentence. The second sentence is separate from the first sentence and results in a second requirement. With the merger module 210 acting before the splitter module 208, the processed output is exemplified in FIG. 20. With the splitter module 208 acting before the merger module 210, the processed output is exemplified in FIG. 21. Note that in the above example with splitting before merging, the three sections/subsections of text are correctly rendered into two Requirements and spread over four rows. The first requirement is the merged requirement resulting from the first sentence of the parent and the two child sections of which one must be are the compliance two allowed compliance pathways. The second requirement is the split requirement from the parent, that being the second sentence of the parent. The last two rows are classified as RAE, since they are represented in the first requirement. Thus, the sequence of splitter module 208 acting before the merger module 210 overcomes a substantial technical challenge in the interpretation of regulations and can be critical to the correct extraction of requirements from the regulatory document, and thus provides a substantial advantage.

In some embodiments, there can be exceptions to the classifications. Described below are examples of some common exceptions.

In some cases, there can be an exception to the split or one-to-many rule. A citation that instructs "inspections" is commonly considered as one requirement in environment health and safety (EHS) industry, no matter how many subtasks are included. The key phrases in such citations are "visually inspect", "inspect" or "perform an inspection". In such cases, there will not be more than one requirement for the citation, even if other sentences in the text appear to make a one-to-many citation. Thus, these REQ can be merged into a single REQ in the Applicable Requirement Description column.

In some cases, there can be another exception to the split or one-to-many rule. Citations with the key phrases of "notify the administrator," or "notify the administrative authority" or "provide notice to", will not constitute a one-to-many citation. Thus, they will be merged in the Applicable Requirement Description column.

In some cases, there can be an exception to the "conjunction with multiple requirements" rule. A parent citation that includes the word(s) "measurement" or "measurements" or similar language, plus the phrase(s) "furnish the Administrator with a report that contains" or "provide a report that includes", should be considered, and all its direct children, as a single requirement. Thus, they will be merged in the Applicable Requirement Description column.

In some cases, the present embodiments can achieve a higher accuracy for the machine learning models by having an expert, or other qualified person, improve the model by iteratively reviewing the results obtained by the model and updating the features of the model. In an example, a live sandbox service (such as Zeppelin notebook) can be deployed to a cloud network, which can be accessed by the experts. The expert could then review the result, add features and indicators on how to improve the model in order to achieve higher prediction accuracy systematically.

In some cases, the splitter module 208 can output a Comma Separated Value (CSV) file that has the format of an output table. In an example, the output table can have 5 columns: Citations Number, Citation Text, Label, Applicable Requirement Description, and Referable Citations.

For the Subpart Kb example, the output table consisted of 173 rows with every applicable requirement and OSR having their own rows. Description (DSC) citations can also be presented in single rows of the output table. A summary of the accuracy of the present system exemplified in the Subpart Kb example is as follows:

A total of 144 citations resulted in 173 rows of applicable requirements and descriptions. Based on an EHS expert's opinion, the total number of rows that should have been created is 173. Therefore, the accuracy of the parser was 100% for Subpart Kb.

As seen in the example shown in FIG. 15, the accuracy of the final predicted labels was 95%.

Figure 16:
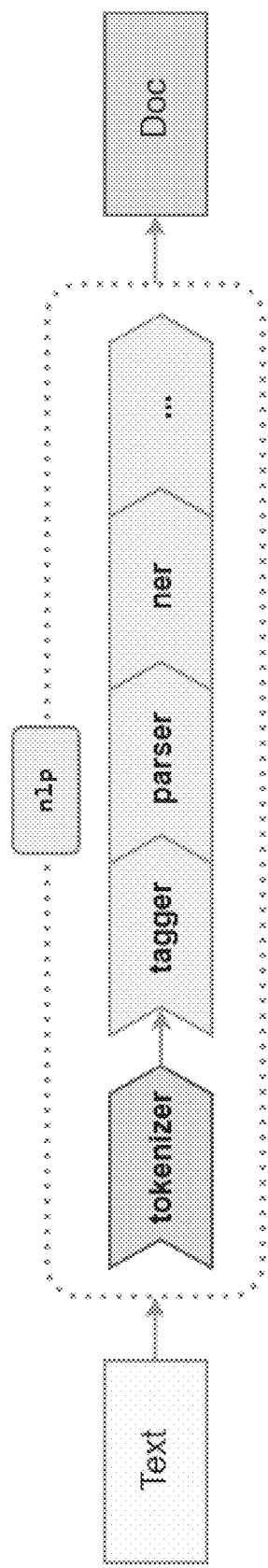
FIG. 16 is an example flow diagram for a Natural Language Processing (NLP) pipeline, in accordance with the system of FIG. 1.

In an embodiment, the parser module 204 can use advanced Natural Language Processing (NLP) to parse the regulatory content. The NLP can provide a variety of linguistic annotations to provide insights into a text's grammatical structure. This includes the word types, such as the parts of speech, and how the words are related to each other. For example, if a system is analyzing text, it is significantly different whether a noun is the subject of a sentence, or the object. The parser module 204 can analyze the regulatory text, for example, using an NLP pipeline. In this pipeline, the text is tokenized to produce an object designed for NLP purposes called Doc. Then each token can be tagged with various labels carrying part-of-speech and dependency information. Also, tokens referring to named entities can be detected and labelled separately. FIG. 16 shows a flow diagram of each step in this pipeline.

During processing, the parser module 204 can tokenize the text; i.e., segment it into words, punctuation, and the like, by applying rules specific to a language. For example, punctuation at the end of a sentence should be split into two words, while an abbreviation such as "U.K." should remain one token. After tokenization, the parser module 204 can parse and tag a given text object. In an example, using a statistical language model, the parser module 204 can make a prediction regarding which tag or label most likely applies in a given context. In some cases, the model consists of binary data and is produced by showing enough examples to a system for it to make predictions that generalize across the language; for example, a word following "the" in English is most likely a noun. A named entity is a "real-world object" that the parser module 204 assigns a name; for example, a person, a country, a product, or a book title. The parser module 204 can recognize various types of named entities in a document, by querying the model for a prediction.

In order to extract relevant attributes of text to be employed by the classifier module 206 for the classification machine learning model, the parser module 204 can transform key words and phrases provided by the experts into patterns that are detectable by the model. A separate column to the input matrix can be added representing each pattern. Each of these columns can be referred to as a feature. Examples of such key words and phrases provided by the experts are listed under Feature Description column, as exemplified in the example feature below. Pattern recognition logic can be applied to the input matrix, row-by-row, and populated by value 1 for each pattern detected in its text under the respected column (or feature), and value 0 for the rest of the columns. This updated matrix can then form the input dataset to the classification model (see for example FIG. 5). The following shows an example feature table:

| Feature # | Feature Name | Feature Description |
|---|---|---|
| F01 | MUST | MUST |
| F02 | IS TO BE | IS TO BE |
| F03 | ARE TO BE | ARE TO BE |
| F04 | MAY | MAY |
| F05 | MAY CHOOSE | MAY CHOOSE |
| F06 | MAY USE | MAY BE USED |
| F07 | MAY OBTAIN | MAY BE OBTAINED |
| F08 | MAY COMPLY | MAY COMPLY |
| F09 | MAY REQUEST | MAY BE REQUESTED |
| F10 | ADMIN MAY | ADMINISTRATOR MAY |
| F11 | CHOOSE COMPLY | CHOOSE TO COMPLY |
| F12 | LIMITATION | ALTERNATIVE MEANS |
| F13 | SHALL NOT | SHALL NOT APPLY |
| F14 | SHALL FOLLOWING | SHALL [VERB] WITH ONE OF THE FOLLOWING |
| F15 | SHALL CONSIDER | SHALL BE CONSIDERED |
| F16 | SHALL EXCEED | SHALL NOT EXCEED |
| F17 | REQUIREMENTS | FOLLOWING REQUIREMENTS |
| F18 | SITE | SITE |
| F19 | OPERATE | OPERATE IN ACCORDANCE WITH |
| F20 | EXEMPT | IS EXEMPT |
| F21 | AUTHORITY | DELEGATION OF AUTHORITY |
| F22 | MEET | MEETING THE FOLLOWING SPECIFICATIONS |
| F23 | DESCRIBE | DESCRIBED IN |
| F24 | PROVIDE | PROVIDED IN |
| F25 | SHALL | SHALL |
| F26 | SHALL DESIGN | SHALL BE DESIGNED |
| F27 | SHALL REPAIR | SHALL REPAIR |
| F28 | EQUIP | SHALL EQUIP |
| F29 | KEEP RECORD | SHALL KEEP A RECORD |
| F30 | MAINTAIN RECORD | SHALL MAINTAIN A RECORD |
| F31 | NOTIFY | SHALL NOTIFY |
| F32 | ADD DIVIDE | ADD [QUANTITY] DIVIDE/COMPARE |
| F33 | SUBMIT | SUBMIT |
| F34 | IDENTIFY | IDENTIFY |
| F35 | REQUIRE | REQUIRED BY |
| F36 | LISTED | LISTED BELOW |
| F37 | SUBJECT TO | SUBJECT TO |
| F38 | INSPECT | INSPECT |
| F39 | AS DETERMINED | AS DETERMINED IN |
| F40 | NOT APPLY | DOES NOT APPLY TO |
| F41 | MEANS | MEANS |
| F42 | TO VERB | IS TO [VERB] |
| F43 | DELEGATE | DELEGATING OR DELEGATED |
| F44 | EXTENSION | SUCH EXTENSION REQUEST |
| F45 | ADMIN SHALL | ADMINISTRATOR SHALL, OR ADMINISTRATOR WILL |
| F46 | DETERMINE | DETERMINE |

The present inventors have experimentally verified the present embodiments using test data from the code of federal regulations on environmental protection (40 CFR); a voluminous set of 37 volumes of fine print code. However, this is exemplary only, and the present embodiments could also be applied to other rule sets, such as for example, the nine volumes of code that relate to food, drug and cosmetics (21 CFR). Health and Safety, as well as State/Province, and local regulations, can also be used, or added to these datasets.

Figure 17:
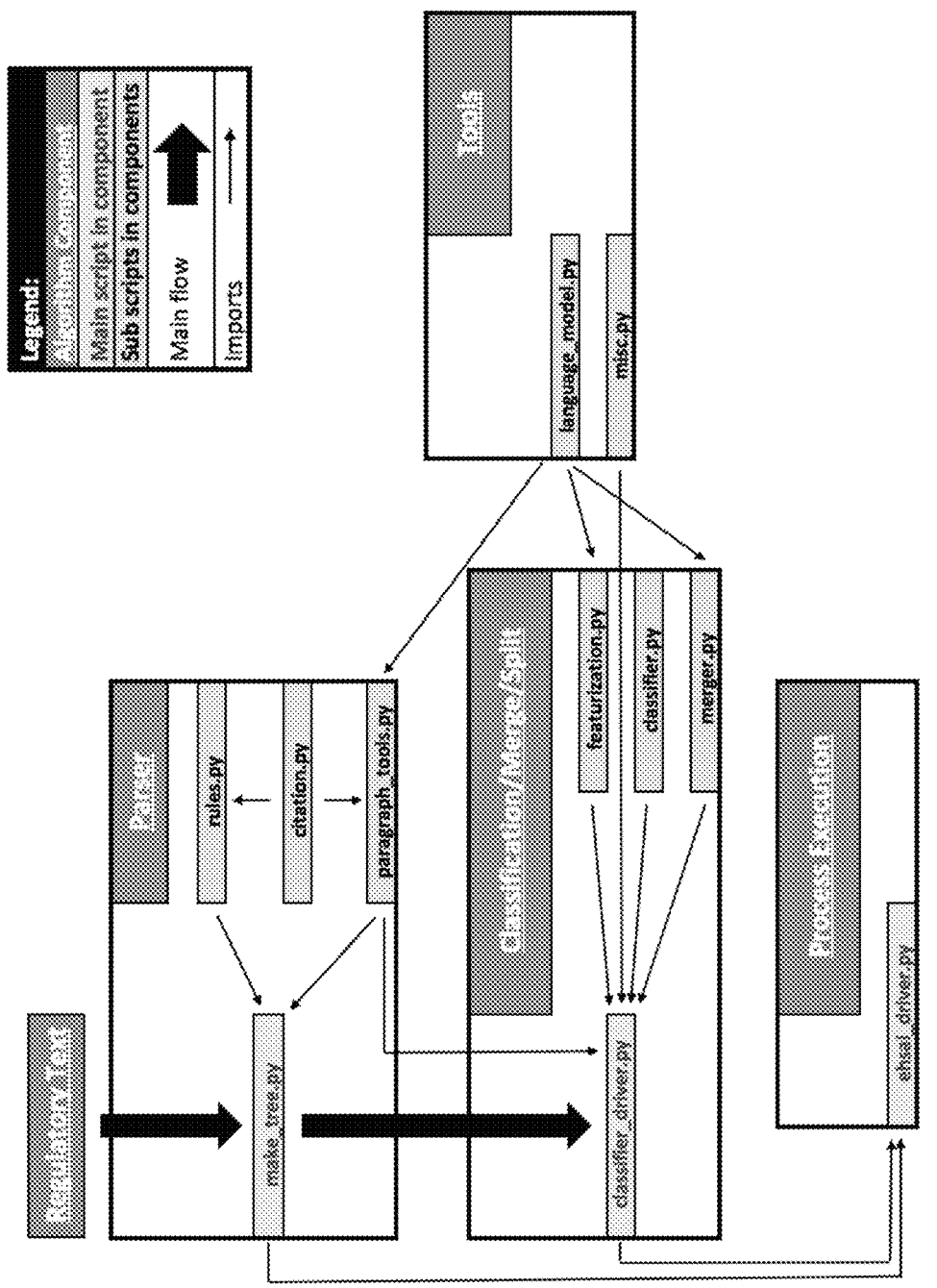
FIG. 17 illustrates an example programming structure for an embodiment of the system of FIG. 1.

FIG. 17 illustrates an example programming structure for an embodiment of the present disclosure. In this example, each main box represents a component of the system 200. Main scripts are the key drivers of a component and can rely on sub scripts to execute their function. Main scripts 'import' sub scripts, i.e. they make use of the functionality the sub scripts provide. Tools is a collection of scripts that can provide functionality to both the parser and classification/merge/splitter modules.

In an example, in view of the example of FIG. 17, the parser module 204 can perform the following pseudocode workflow:

1. Clean up and validate the input
    Takes place through make_tree.py
        make_tree.py uses tools defined in rules.py
            rule.py cleans the input by eliminating text like 'definitions'
2. Extract citation number and citation text for each paragraph (node)
    Takes place through make_tree.py
        make_tree.py uses tools defined in citation.py and paragraph_tools.py
            citation.py identifies the citation for each piece of text
            paragraph_tools.py defines and identifies the structure of text
3. Build a tree structure and position each node in the structure
    Takes place in make_tree.py
        make_tree.py uses step 1 and 2 to build a tree structure that represents the text
        Tree structure is optimal storage for a hierarchy like this
        Also most efficient for searching/sorting In an example, in view of the example of FIG. 17, the classifier module 206 can perform the following pseudocode workflow:

1. Load results from parser module 204 into a matrix where each paragraph (citation) is recorded in a single row
    Takes place through classifier_driver.py
        Confirms file (results) haven't been corrupted
        classifier_driver.py uses tools defined in text_processor.py
            text_processor.py builds the matrix structure among other functionality
2. Clean raw input data, by removing blank paragraphs or texts not related to citations; for example, "Back to Top".
    Takes place through classifier_driver.py
        classifier_driver.py uses tools defined in text_processor.py
            text_processor.py processes the raw input data
3. Translate key words and phrases introduced, into patterns that are detectable by the algorithm and add a separate column to the input matrix to represent them
    These are referred to as 'features'
    Take places through classifier_driver.py
        classifier_driver.py uses tools defined in text_processor.py
            text_processor.py formats the data into a matrix of features/citations
4. Run the input matrix through the pattern recognition logic row-by-row and populate value 1 for each pattern detected in the text under the respected column (feature), and zero for the rest. This new matrix forms the input dataset to the classification algorithm.
    Takes place through classifier_driver.py
        classifier_driver.py uses tools defined in featurization.py
            featurization.py conducts the pattern recognition logic, populating the matrix
5. The above binary matrix of features is paired with the true labels of each citation text provided by experts to compose input dataset that is fed into the supervised learning process
    Takes place through classifier_driver.py
        classifier_driver.py uses tools defined in text_processor.py
            text_processor.py maps true labels to matrix
6. Train a Gradient Boosting Classifier algorithm for the three-class problem at hand (REQ/DESC/OSR). 5-fold cross-validation scheme implemented during the training phase to avoid overfitting the classifier to the training subset.
    Gradient boosting produces a prediction model in the form of an ensemble of weak prediction models, typically decision trees
    Takes place through classifier_driver.py
        classifier_driver.py uses tools defined in classifier.py and text_processor.py
            classifier.py trains models, predicts, and assesses accuracy
            text_processor.py creates training/test splits in the data
7. Select classification model with the highest accuracy based on a F1 score (found model with 0.842±0.067) on the training subset
    Takes place through classifier_driver.py
        classifier_driver.py uses tools defined in classifier.py
            classifier.py assesses the F1 score
8. Use candidate model to predict labels of citation texts in the test subset and the accuracy of predictions on the test subset is calculated and the model is tuned as needed
    Takes place through classifier_driver.py
        classifier_driver.py uses tools defined in classifier.py
            classifier.py predicts, assesses accuracy, and allows for model tuning In an example, in view of the example of FIG. 17, the merger module 210 can perform the following pseudocode workflow:

1. Before applying the merger on the citations, update some of the labels from the classifier based on the regulatory language and parent-child relationship
    Take places through classifier_driver.py
        classifier_dirver.py uses tools defined in merger.py
            merger.py implements label updates based on preset rules
2. Merge based on three types of parent-child relationships
    Takes place through classifier_driver.py
        classifier_driver.py uses tools defined in merger.py
            merger.py implements merge based on determined relationship In an example, in view of the example of FIG. 17, the splitter module 208 can perform the following pseudocode workflow:

1. Each citation that has been labeled as a requirement, optional, or site-specific requirement is examined sentence-by-sentence to determine whether it constitutes more than one requirement
    Takes place through classifier_driver.py
        classifier_driver.py uses tools defined in paragraph_tools.py
            paragraph_tools.py allows for examination sentence by sentence Although the foregoing has been described with reference to certain specific embodiments, various modifications thereto will be apparent to those skilled in the art without departing from the spirit and scope of the invention as outlined in the appended claims.

The invention claimed is:

1. A computer-implemented method for extracting requirements from regulatory content data, the regulatory content data comprising regulatory text, the regulatory text comprising citations, the method comprising:
receiving the regulatory content data;
classifying an associated type for each citation in the regulatory content data using a trained classifier machine learning model, the classifier machine learning model trained using regulatory content data comprising expert labelled annotations;
splitting the citations in the regulatory content data, comprising determining whether each of the citations comprise more than one requirement;
merging one or more of the citations in the regulatory content data, comprising identifying child-parent relationships for the citations and merging the citations based on conjunctive language; and
outputting the citations and their associated type.

2. The method of claim 1, wherein the associated types for classification comprise one of a requirement (REQ), an optional or site-specific requirement (OSR), a description (DSC), and part of another requirement.

3. The method of claim 2, wherein splitting the citations in the regulatory content data further comprises, when a given citation has been classified as REQ or OSR, breaking the given citation into sentences, applying the classifier machine learning model to each of the sentences to identify an associated type for the each of the sentences, and where there are more than one REQ or OSR type sentence for the given citation, splitting said sentences.

4. The method of claim 1, further comprising parsing the regulatory content data, comprising generating a tree structure with the citations as nodes and citation numbers associated with the citations representing branch relationships of the tree structure.

5. The method of claim 1, wherein merging the one or more of the citations comprises identifying conjunction type as one of an AND conjunction, an OR conjunction, or a NO conjunction.

6. The method of claim 5, wherein the AND conjunction indicates every direct child citation of child citations represents at least one requirement to be merged with a parent citation, the OR conjunction indicates all of the child citations are merged to form a single requirement with the parent citation, and the NO conjunction indicates there is no merger.

7. The method of claim 5, wherein merging of the one or more of the citations uses a natural language processing machine learning model trained using regulatory content data comprising expert labelled annotations for conjunction types.

8. The method of claim 5, wherein merging the citations based on conjunctive language comprises identifying the conjunction type on a per-sentence basis.

9. The method of claim 1, wherein the classifier machine learning model comprises a gradient boosting classifier.

10. The method of claim 1, wherein splitting the citations in the regulatory content data is prior to merging the one or more of the citations in the regulatory content data.

11. A system for extracting requirements from regulatory content data, the regulatory content data comprising regulatory text, the regulatory text comprising citations, the system comprising one or more processors and a data storage, the data storage comprising instructions for causing the one or more processors to execute:
an input module to receive the regulatory content data;
a classifier module to classify an associated type for each citation in the regulatory content data using a trained classifier machine learning model, the classifier machine learning model trained using regulatory content data comprising expert labelled annotations;
a splitter module to split the citations in the regulatory content data, comprising determining whether each of the citations comprise more than one requirement;
a merger module to merge one or more of the citations in the regulatory content data, comprising identifying child-parent relationships for the citations and merging the citations based on conjunctive language; and
an output module to output the citations and their associated type.

12. The system of claim 11, wherein the associated types for classification comprise one of a requirement (REQ), an optional or site-specific requirement (OSR), a description (DSC), and part of another requirement.

13. The system of claim 12, wherein, when a given citation has been classified as REQ or OSR, the splitter module splits the citations in the regulatory content data by breaking the given citation into sentences, applying the classifier machine learning model to each of the sentences to identify an associated type for the each of the sentences, and where there are more than one REQ or OSR type sentence for the given citation, splitting said sentences.

14. The system of claim 11, further comprising a parser module to parse the regulatory content data, comprising generating a tree structure with the citations as nodes and citation numbers associated with the citations representing branch relationships of the tree structure.

15. The system of claim 11, wherein the merger module merges the one or more of the citations by identifying conjunction type as one of an AND conjunction, an OR conjunction, or a NO conjunction.

16. The system of claim 15, wherein the AND conjunction indicates every direct child citation of child citations represents at least one requirement to be merged with a parent citation, the OR conjunction indicates all of the child citations are merged to form a single requirement with the parent citation, and the NO conjunction indicates there is no merger.

17. The system of claim 15, wherein the merger module merges the one or more of the citations using a natural language processing machine learning model trained using regulatory content data comprising expert labelled annotations for conjunction types.

18. The system of claim 15, wherein the merger module merges the citations based on conjunctive language by identifying the conjunction type on a per-sentence basis.

19. The system of claim 11, wherein the classifier machine learning model comprises a gradient boosting classifier.

20. The system of claim 11, wherein the splitter module splits the citations in the regulatory content data prior to the merger module merging the one or more of the citations in the regulatory content data.

* * * * *